United States Patent
Sasaki et al.

(10) Patent No.: US 6,470,850 B1
(45) Date of Patent: Oct. 29, 2002

(54) INTERNAL COMBUSTION ENGINE

(75) Inventors: Shizuo Sasaki, Numazu; Takekazu Ito, Shizuoka-ken, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/720,687

(22) PCT Filed: Jul. 9, 1999

(86) PCT No.: PCT/JP99/03737
§ 371 (c)(1),
(2), (4) Date: Dec. 29, 2000

(87) PCT Pub. No.: WO00/03134
PCT Pub. Date: Jan. 20, 2000

(30) Foreign Application Priority Data

Jul. 10, 1998  (JP) ........................................ 10-195879

(51) Int. Cl.⁷ ..................... F02B 13/10; F02M 25/06; F02M 25/07
(52) U.S. Cl. ................... 123/305; 123/568.21; 60/278
(58) Field of Search ................. 123/568.21, 568.24, 123/568.26, 295, 305; 60/274, 276, 278

(56) References Cited

U.S. PATENT DOCUMENTS

| | | |
|---|---|---|
| 5,743,243 A | 4/1998 | Yanagihara |
| 5,775,099 A | 7/1998 | Ito et al. |
| 5,937,639 A * | 8/1999 | Sasaki et al. ................. 60/276 |

FOREIGN PATENT DOCUMENTS

| | | |
|---|---|---|
| JP | 5-18245 | 1/1993 |
| JP | 6-66135 | 3/1994 |
| JP | 7-189767 | 7/1995 |
| JP | 7-332071 | 12/1995 |
| JP | 8-281071 | 10/1996 |
| JP | 9-287527 | 11/1997 |
| JP | 9-287528 | 11/1997 |
| JP | 10-30442 | 2/1998 |
| JP | 10-131757 | 5/1998 |

* cited by examiner

Primary Examiner—Gene Mancene
Assistant Examiner—Arnold Castro
(74) Attorney, Agent, or Firm—Oliff & Berridge, PLC

(57) ABSTRACT

A fuel injector and a spark plug are arranged inside a combustion chamber of an internal combustion chamber. Fuel is injected from the fuel injector at the end of the compression stroke. When the amount of EGR gas is increased, the amount of production of soot peaks. When the amount of EGR gas is further increased, soot is no longer produced. The amount of EGR gas in the combustion chamber is made larger than the amount of EGR gas where the amount of production of soot peaks. Due to this, the production of soot in the combustion chamber is suppressed.

19 Claims, 17 Drawing Sheets

INTERNAL COMBUSTION ENGINE

TECHNICAL FIELD

The present invention relates to an internal combustion engine.

BACKGROUND ART

Known is a direct injection type internal combustion engine which forms an air-fuel mixture in a limited region of a combustion chamber and ignites the air-fuel mixture by a spark plug when the engine load is relatively low and which fills the combustion chamber with a uniform air-fuel mixture and ignites the uniform air-fuel mixture by a spark plug when the engine load becomes higher. In this direct injection type internal combustion engine, normally, for example as disclosed in Japanese Unexamined Patent Publication (Kokai) No. 5-18245, the spark plug is arranged at the center of the inner wall surface of a cylinder head, a groove extending from below a fuel injector to below the spark plug is formed in a top surface of a piston, fuel is injected toward the groove when the engine load is relatively low, and the injected fuel is guided by the bottom surface of the groove to form an air-fuel mixture in a limited region around the spark plug.

If fuel is injected from the fuel injector, however, right after injection, an overly rich air-fuel mixture is formed at the center of the fuel mist. Therefore, if the air-fuel mixture is ignited by the spark plug right after fuel injection, the overly rich air-fuel mixture is burned and as a result a large amount of soot is produced. Accordingly, in the past, in direct injection type internal combustion engines, the practice had been to advance the fuel injection timing to cause the injected fuel to disperse before ignition and eliminate the presence of an overly rich air-fuel mixture region around when the mixture was ignited and thereby prevent the generation of soot.

When forming an air-fuel mixture in a limited region in a combustion chamber, however, if advancing the fuel injection timing to cause the injected fuel to disperse in this way, a considerably lean air-fuel ratio region is formed over an extensive area around the air-fuel mixture. If a considerably lean air-fuel ratio region is formed over an extensive area in this way, however, the flame of ignition of the spark plug will not be propagated well in that region and therefore a large amount of unburned hydrocarbons will be produced. That is, the amount of fuel not being burned well will increase, so the problem of an increase in the amount of fuel consumption will arise.

In this case, if delaying the fuel injection timing to ignite the air-fuel mixture before the injected fuel disperses, the flame of ignition will quickly be propagated to the air-fuel mixture as a whole and the air-fuel mixture as a whole will be burned. As a result, almost no unburned hydrocarbons will be produced and the amount of fuel consumption can be reduced. At this time, however, an overly rich air-fuel mixture region will be formed, so as explained above a large amount of soot will be produced.

If a large amount of soot were not produced at this time, no unburned hydrocarbons would be produced and ideal combustion with little fuel consumption could be obtained.

On the other hand, in the past, in internal combustion engines, the production of $NO_x$ has been suppressed by connecting the engine exhaust passage and the engine intake passage by an exhaust gas recirculation (EGR) passage so as-to cause the exhaust gas, that is, the EGR gas, to recirculate in the engine intake passage through the EGR passage. In this case, the EGR gas has a relatively high specific heat and therefore can absorb a large amount oft heat, so the larger the amount of EGR gas, that is, the higher the EGR rate (amount of EGR gas/(amount of EGR gas+ amount of intake air), the lower the combustion temperature in the engine intake passage. When the combustion temperature falls, the amount of $NO_x$. produced falls and therefore the higher the EGR rate, the lower the amount of $NO_x$ produced.

In this way, in the past, it was known that the higher the EGR rate, the lower the amount of $NO_x$ produced can become. If the EGR rate is increased, however, the amount of soot produced, that is, the smoke, starts to sharply rise when the EGR rate passes a certain limit. In this point, in the past, it was believed that if the EGR rate was increased further, the concentration of oxygen. around the fuel would fall and result in an overly rich mixture and the smoke would increase without limit. Therefore, it was believed that the EGR rate at which smoke starts to rise sharply was the maximum allowable limit of the EGR rate.

Therefore, in the past, the EGR rate was set within a range not exceeding this maximum allowable limit. The maximum allowable limit of the EGR rate differed considerably according to the type of the engine and the fuel, but was from 30 percent to 50 percent or so. Accordingly, in conventional internal combustion engines, the EGR rate was suppressed to 30 percent to 50 percent or so at a maximum.

Since it was believed in the past that there was a maximum allowable limit to the EGR rate, in the past the EGR rate had been set within a range not exceeding that maximum allowable limit so that the amount of $NO_x$ produced would become as small as possible. Even if the EGR rate is set in this way so that the amount of $NO_x$ produced becomes as small as possible, however, there are limits to the reduction of the amount of production of $NO_x$. In practice, therefore, a considerable amount of $NO_x$ continues being produced.

In the process of studying the combustion in internal combustion engines, however, the present inventors discovered that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of $NO_x$ produced at this time was extremely small. They engaged in further studies later based on this discovery to determine the reasons why soot was not produced and as a result constructed a new system of combustion able to simultaneously reduce the soot and $NO_x$ more than ever before. This new system of combustion will be explained in detail later, but briefly it is based on the idea of stopping the growth of hydrocarbons into soot at an intermediate stage before the hydrocarbons grow.

That is, what was found from repeated experiments and research was that the growth of hydrocarbons stops at an intermediate stage before becoming soot when the temperature of the fuel and the gas around the fuel at the time of combustion in the combustion chamber is lower than a certain temperature and the hydrocarbons grow to soot all at once when the temperature of the fuel and the gas around the fuel becomes higher than a certain temperature. In this case, the temperature of the fuel and the gas around the fuel is greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperature of the fuel and the gas around the fuel.

Therefore, if the temperature of the fuel and the gas around the fuel at the time of combustion in the combustion chamber is suppressed to no more than a temperature at which the growth of the hydrocarbons stops midway, soot is no longer produced. The temperature of the fuel and the gas around the fuel at the time of combustion in the combustion chamber can be suppressed to no more than a temperature at which the growth of the hydrocarbons stops midway by adjusting the amount of heat absorbed by the gas around the fuel. On the other hand, the hydrocarbons stopped in growth midway before becoming soot, that is, the unburned hydrocarbons, are exhausted, but the amount of exhaust of the unburned hydrocarbons is far less than when advancing the fuel injection timing.

Therefore, when delaying the fuel injection timing, if using this new combustion system, even if an overly rich air-fuel mixture region is formed, almost no soot is produced and further almost no $NO_x$ is produced. Therefore, ideal combustion in which almost no soot and $NO_x$ are produced and the amount of fuel consumption is small can be obtained.

DISCLOSURE OF THE INVENTION

An object of the present invention is to provide an internal combustion engine capable of obtaining this ideal combustion.

According to the present invention, there is provided an internal combustion engine provided with a spark plug for igniting fuel injected into a combustion chamber and in which an amount of production of soot peaks when an amount of inert gas in the combustion chamber is increased if delaying a fuel injection timing in a compression stroke, wherein the amount of inert gas in the combustion chamber is made greater than the amount of insert gas at which the amount of production of soot peaks and thereby the temperature of the fuel and the gas around it at the time of combustion in the combustion chamber is suppressed to a temperature lower than the temperature at which soot is produced, whereby the production of soot is suppressed.

BEST MODE FOR CARRYING OUT THE INVENTION

Figure 1:
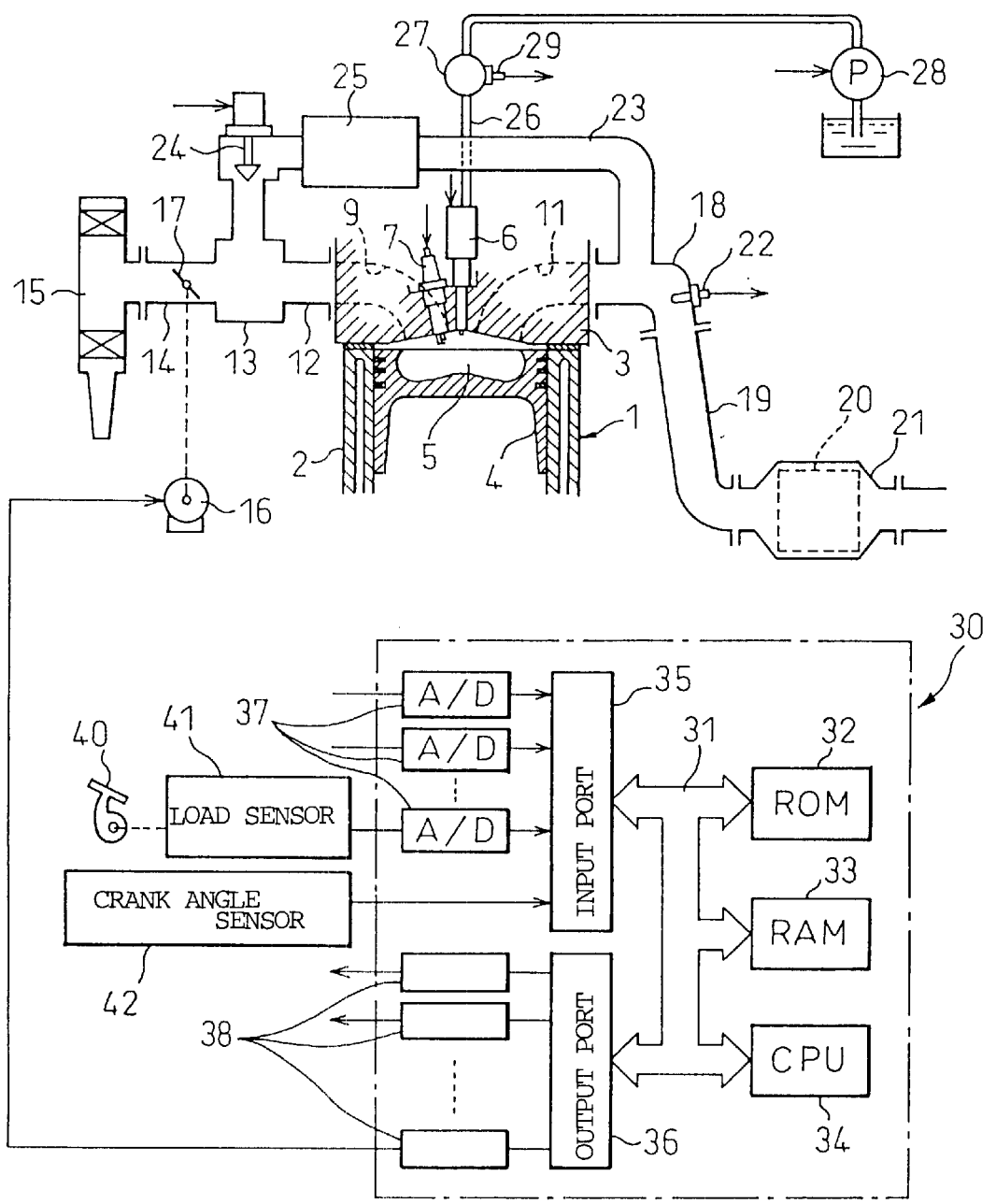
FIG. 1 is an overall view of a spark ignition type internal combustion engine.
Figure 2:
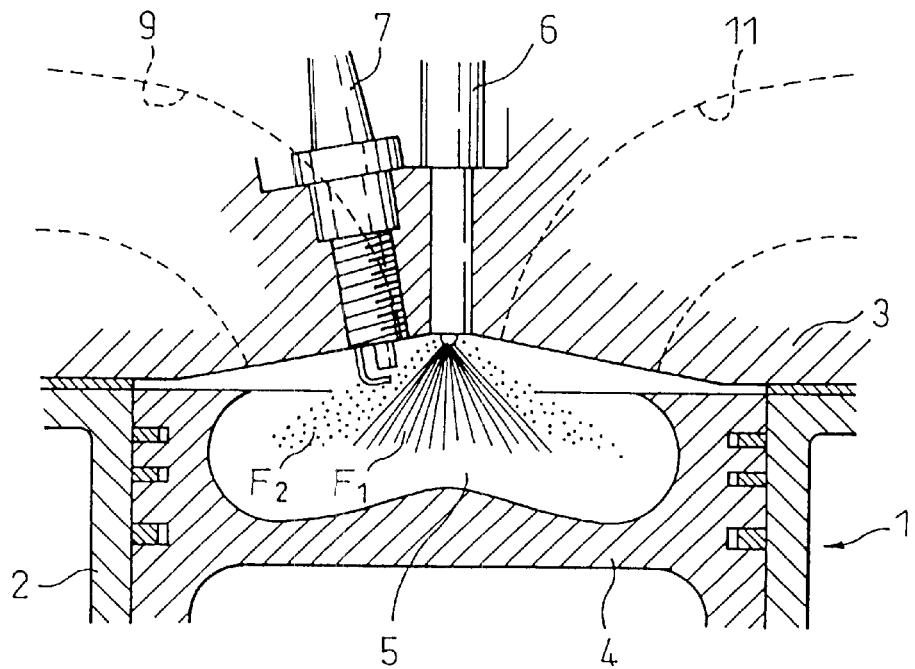
FIG. 2 is a side sectional view of the internal combustion engine shown in FIG. 1.
Figure 3:
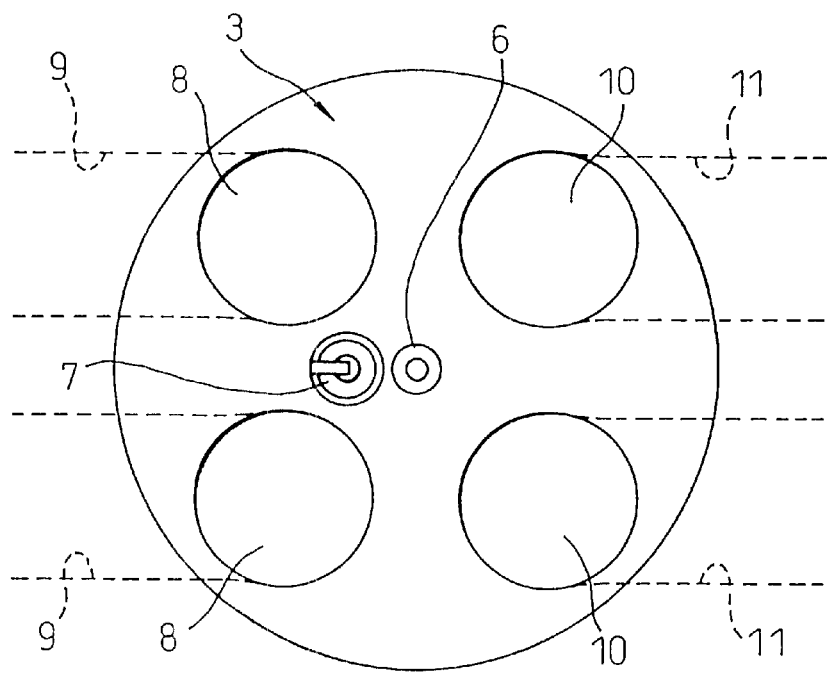
FIG. 3 is a bottom view of a cylinder head shown in FIG. 2.

FIG. 1 to FIG. 3 show the case of application of the present invention to a four-stroke spark ignition type internal combustion engine.

Referring to FIG. 1 to FIG. 3, 1 shows an engine body, 2 a cylinder block, 3 a cylinder head, 4 a piston, 5 a combustion chamber, 6 an electrically controlled fuel injector, 7 a spark plug, 8 a pair of intake valves, 9 an intake port, 10 a pair of exhaust valves, and 11 an exhaust port. As shown in FIG. 2 and FIG. 3, the fuel injector 6 and the spark plug 7 are arranged adjoining each other at the center of the inner wall surface of the cylinder head 3.

As shown in FIG. 1, the intake port 9 is connected through a corresponding intake pipe 12 to a surge tank 13. The surge tank 13 is connected through an intake duct 14 to an air cleaner 15. Inside the air duct 14 is arranged a throttle valve 17 driven by a step motor 16. On the other hand, the exhaust port 11 is connected through an exhaust manifold 18 and exhaust tube 19 to a catalytic converter 21 housing a catalyst 20 having an oxidation function. Inside the exhaust manifold 18 is arranged an air-fuel ratio sensor 22.

The exhaust manifold 18 and the surge tank 13 are connected with each other through an EGR passage 23. Inside the EGR passage 23 is arranged an electrically controlled EGR control valve 24. Further, inside the EGR passage 23 is arranged an intercooler 25 for cooling the EGR gas flowing through the EGR passage 23. In the embodiment shown in FIG. 1, engine cooling water is led into the intercooler 25 and that engine cooling water used to cool the EGR gas.

On the other hand, each fuel injector 6 is connected through a fuel supply line 26 to a fuel reservoir 27. Fuel is supplied to the fuel reservoir 27 from an electrically controlled variable discharge fuel pump 28. Fuel supplied in the fuel reservoir 27 is supplied through the fuel supply lines 26 to the fuel injectors 6. A fuel pressure sensor 29 for detecting the fuel pressure in the fuel reservoir 27 is attached to the fuel reservoir 27. The amount of discharge of the fuel pump 28 is controlled based on the output signal of the fuel pressure sensor 29 so that the fuel pressure in the fuel reservoir 27 becomes the target fuel pressure.

An electronic control unit 30 is comprised of a digital computer and is provided with a ROM (read only memory) 32, a RAM (random access memory) 33, a CPU (microprocessor) 34, an input port 35, and an output port 36 connected with each other by a bidirectional bus 31. The output signal of the air-fuel ratio sensor 22 is input through a corresponding AD converter 37 to the input port 35, while the output signal of the fuel pressure sensor 29 is also input through a corresponding AD converter 37 to the input port 35. The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. On the other hand, the output port 36 has connected to it through a corresponding drive circuit 38 the fuel injectors 6, the step motor 16, the EGR control valve 24, and the fuel pump 28.

Figure 4:
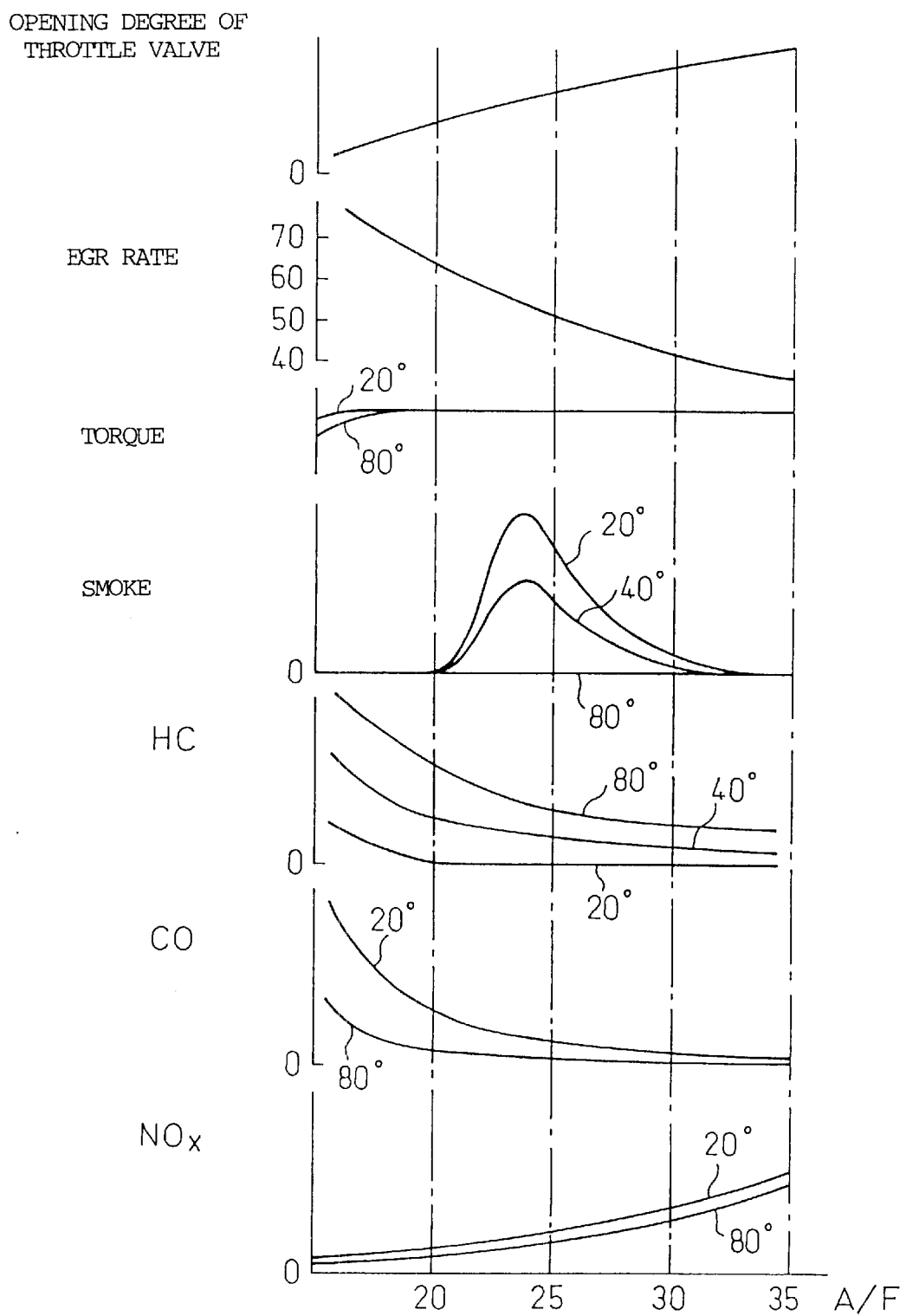
FIG. 4 is a view of the amount of generation of smoke, hydrocarbons, and $NO_x$, etc.

FIG. 4 shows an example of an experiment showing the changes in the output torque and the amount of exhaust of smoke, hydrocarbons, carbon monoxide, and $NO_x$ when changing the air fuel ratio A/F (abscissa in FIG. 4) by changing the opening degree of the throttle valve 17, the EGR rate, and the fuel injection timing when the engine load is relatively low. As will be understood from FIG. 4, in this experiment, the EGR rate becomes larger the smaller the air fuel ratio A/F. When the air-fuel ratio is not more than 20, the EGR rate becomes more than 65 percent. Note that in FIG. 4, 20°, 40°, and 80° show the fuel injection timings expressed by values before top dead center of the compression stroke.

As shown in FIG. 4, if increasing the EGR rate to reduce the air fuel ratio A/F, regardless of the fuel injection timing, the amount of $NO_x$ produces gradually falls. On the other hand, when the fuel injection timing is early, that is, at BTDC 80°, regardless of the air-fuel ratio A/F, no smoke is generated, but a large amount of unburned hydrocarbons is produced. That is, when the fuel injection timing is early, the injected fuel is dispersed across an extensive area before being ignited by the spark plug 7 and therefore there is no overly rich air-fuel mixture region and thus no production of soot. In this case, however, as mentioned at the start, a considerably lean air-fuel mixture region is formed, so a large amount of unburned hydrocarbons is produced.

As shown in FIG. 4, when the fuel injection timing is early, the amount of unburned hydrocarbons produced increases and the amount of fuel consumption falls the greater the EGR rate. Therefore, it is not preferable to increase the EGR rate when the fuel injection timing is early.

As opposed to this, when delaying the fuel injection timing, for example, when making the fuel injection timing BTDC 20°, an overly rich air-fuel mixture region is formed at the time of the ignition action of the spark plug 7. In this case, as shown in FIG. 4, if the EGR rate is increased, the amount of smoke produced starts to increase when the EGR rate reaches near 40 percent. Next, if the EGR rate is further raised and the air-fuel ratio A/F reduced, the amount of smoke produced sharply increases and reaches a peak. Next, if the EGR rate is further raised and the air-fuel ratio A/F reduced, the smoke then sharply falls. If the EGR rate is made more than 65 percent and the air-fuel ratio A/F becomes not more than 20, almost zero smoke is produced. That is, almost no soot is produced any longer. At this time, the output torque of the engine falls somewhat and the amount of production of $NO_x$ becomes considerably low. On the other hand, the amounts of hydrocarbons and carbon monoxide produced start to increase.

When the fuel injection timing is delayed, the following may be said from the results of the experiment shown in FIG. 4. That is, first, when the air-fuel ratio A/F is not more than 20 and the amount of production of smoke is substantially zero, as shown in FIG. 4, the amount of $NO_x$ produced falls considerably. A fall in the amount of production of $NO_x$ means a fall in the combustion temperature in the combustion chamber 5. Therefore, it may be said that the combustion temperature in the combustion chamber 5 becomes lower when almost no soot is produced.

Second, when the amount of smoke produced, that is, the amount of soot produced, becomes substantially zero, as shown in FIG. 4, the amounts of exhaust of hydrocarbons and carbon monoxide increase. This means that the hydrocarbons are exhausted without growing into soot. That is, the hydrocarbons contained in the fuel decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons in the fuel grow to soot through the soot precursor. Therefore, as explained above, when the amount of production of soot becomes substantially zero, the amounts of exhaust of hydrocarbons and carbon monoxide increase as shown in FIG. 4, but the hydrocarbons at this time are a soot precursor or a state of hydrocarbons before that.

Summarizing these considerations based on the results of the experiment shown in FIG. 4, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperature of the fuel and the gas around the fuel in the combustion chamber 5 is below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of $NO_x$. Therefore, this certain temperature can be defined to a certain degree from the amount of production of $NO_x$. That is, the greater the EGR rate, the lower the temperature of the fuel and the gas surrounding it at the time of combustion and the lower the amount of $NO_x$ produced. At this time, when the amount of $NO_x$ produced becomes around 10 ppm or less, almost no soot is produced any more. Therefore, the above certain temperature substantially matches the temperature when the amount of $NO_x$ produced becomes 10 ppm or less. once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the In this case, to suppress the temperature of the fuel and the gas around it to a temperature lower than the temperature at which soot is produced, an amount of inert gas enough to absorb an amount of heat sufficient for this is required. Therefore, if the amount of fuel increases, the amount of inert gas required increases along with the same. Note that in this case, the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

Figure 5:
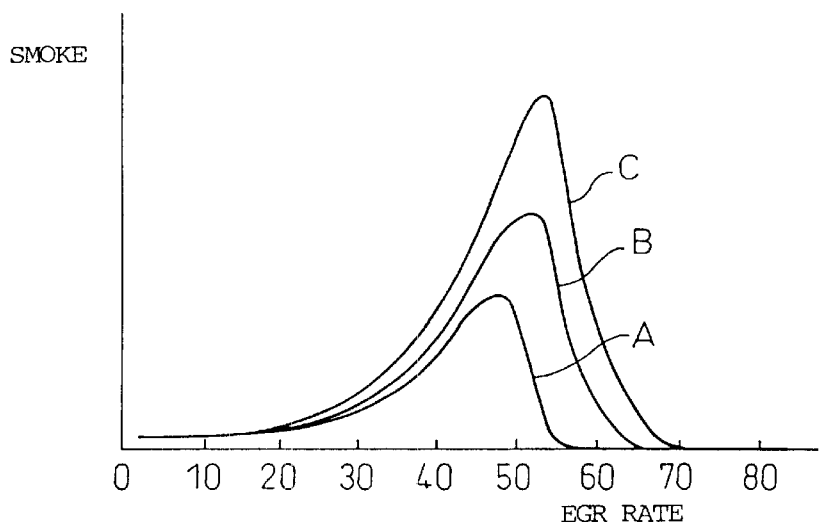
FIG. 5 is a view of the relationship between the amount of generation of smoke and the EGR rate.

FIG. 5 shows the relationship between the EGR rate and smoke when using EGR gas as the inert gas and changing the degree of cooling of the EGR gas in the stae of a fuel injection timing of BTDC 20°. That is, the curve A in FIG. 5 shows the case of force cooling the EGR gas and maintaining the temperature of the EGR gas at about 90° C., curve B shows the case of cooling the EGR gas by a compact cooling apparatus, and curve C shows the case of not force cooling the EGR gas.

When force cooling the EGR gas as shown by the curve A in FIG. 5, the amount of soot produced peaks when the EGR rate is a little under 50 percent. In this case, if the EGR rate is made about 55 percent or higher, almost no soot is produced any longer.

On the other hand, when the EGR gas is slightly cooled as shown by curve B in FIG. 5, the amount of soot produced peaks when the EGR rate is slightly higher than 50 percent. In this case, if the EGR rate is made above about 65 percent, almost no soot is produced any longer.

Further, when the EGR gas is not force cooled as shown by curve C in FIG. 5, the amount of soot produced peaks near an EGR rate near 55 percent. In this case, if the EGR rate is made over about 70 percent, almost no soot is produced any longer. Note that FIG. 5 shows the hydrocarbons are exhausted from the combustion chamber 5 in the form of a soot precursor or a state before that or exhausted from the combustion chamber 5 in the form of soot.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas. amount of smoke produced when the engine load is relatively high. When the engine load becomes small, the EGR rate at which the amount of soot produced peaks falls somewhat and the lower limit of the EGR rate at which almost no soot is produced any longer falls somewhat. In this way, the lower limit of the EGR rate at which almost no soot is produced any longer changes in accordance with the degree of cooling of the EGR gas or the engine load.

Figure 6:
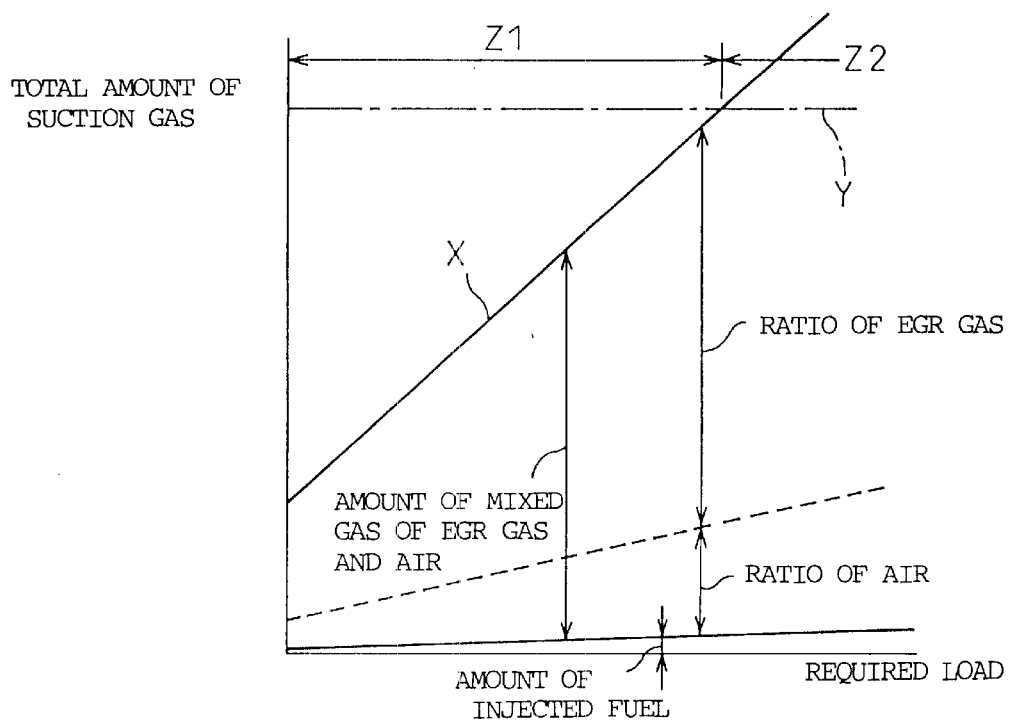
FIG. 6 is a view of the relationship between the amount of injected fuel and the EGR rate.

FIG. 6 shows the amount of mixed gas of EGR gas and air, the ratio of air in the mixed gas, and the ratio of EGR gas in the mixed gas required for making the temperature of the fuel and the gas around it at the time of combustion a temperature lower than the temperature at which soot is produced in the case of use of EGR gas as an inert gas and of delaying the fuel injection timing. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load Z1 shows the operating region of a relatively low load.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air fuel ratio. On the other hand, in FIG. 6, the ratio of EGR gas, that is, the amount of EGR gas in the mixed gas, shows the minimum amount of EGR gas required for making the temperature of the fuel and the gas around it a temperature lower than the temperature at which soot is produced when the injected fuel is burned. This amount of EGR gas is, expressed in terms of the EGR rate, more than 55 percent— in the embodiment shown in FIG. 6, more than 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperature of the fuel and the gas around it becomes a temperature lower than the temperature at which soot is produced and therefore no soot at all is produced any longer. Further, the amount of $NO_x$ produced at this time is around 10 ppm or less and therefore the amount of $NO_x$ produced becomes extremely small.

If the amount of fuel injected increases, the amount of heat generated at the time of combustion of the fuel increases, so to maintain the temperature of the fuel and the gas around it at a temperature lower than the temperature at which soot is produced, the amount of heat absorbed by the EGR gas must be increased. Therefore, as shown in FIG. 6, the amount of EGR gas has to be increased relative to the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot, both the EGR gas and the suction gas become necessary or the EGR gas has to be supercharged or pressurized. When not supercharging or pressurizing the EGR gas etc., in the load region Z2, the total amount of suction gas X matches with the total amount of suction gas Y able to be taken in. Therefore, in this case, to inhibit the production of soot, the amount of air is reduced somewhat to increase the amount of EGR gas and the fuel is burned with a rich air-fuel ratio.

As explained above, FIG. 6 shows the case of burning the fuel at the stoichiometric air-fuel ratio. Even if the amount of air in the operating region Z1 shown in FIG. 6 is made smaller than the amount of air shown in FIG. 6, however, that is, even if the air-fuel ratio is made rich, it is possible to reduce the amount of production of $NO_x$ to around 10 ppm or less while inhibiting the production of soot. Further, even if the amount of air in the operating region Z1 shown in FIG. 6 is made greater than the amount of air shown in FIG. 6, that is, even if the mean value of the air-fuel ratio is made lean, it is possible to reduce the amount of production of $NO_x$ to around 10 ppm or less while inhibiting the production of soot.

That is, if the air-fuel ratio is made rich, the fuel becomes excessive, but since the combustion temperature is suppressed to a low temperature, the excess fuel does not grow into soot and therefore no soot is produced. Further, at this time, only an extremely small amount of $NO_x$ is produced. On the other hand, when the air-fuel ratio is lean or even when the air-fuel ratio is the stoichiometric air-fuel ratio, if the combustion temperature becomes high, a small amount of soot is produced, but in the present invention, the combustion temperature is suppressed to a low temperature, so no soot at all is produced. Further, only an extremely small amount of $NO_x$ is produced.

In this way, in the operating region Z1, regardless of the air-fuel ratio, that is, whether the air-fuel ratio is rich, the stoichiometric air-fuel ratio, or lean, no soot is produced and the amount of $NO_x$ produced becomes extremely small. Therefore, considering the improvement in the fuel consumption efficiency, it can be said to be preferable to make the air-fuel ratio lean at this time.

If making the EGR rate more than 55 percent in this way, even if the air-fuel mixture is overly rich, no soot is produced any longer. Therefore, even when delaying the fuel injection timing, for example, even at a fuel injection timing of BTDC 20°, if the EGR rate is made more than 55 percent, no soot is produced any longer. At this time, as will be understood from FIG. 4, unburned hydrocarbons are produced, but the amount of unburned hydrocarbons produced is considerably smaller than the case of a fuel injection timing of BTDC 80° and therefore it becomes possible to reduce the amount of fuel consumption compared with the case of a fuel injection timing of BTDC 80°. Further, as will be understood from FIG. 4, if the EGR rate is increased until no soot is produced any longer, the amount of $NO_x$ produced becomes extremely small. Therefore, if the EGR rate is increased until an EGR rate where no soot is produced any longer and the fuel injection timing is delayed, ideal combustion in which almost no soot and $NO_x$ are produced and the amount of fuel consumption can be reduced is obtained.

Therefore, in the present invention, to perform this ideal combustion, the EGR rate is increased to an EGR rate where no soot is produced any longer and the fuel injection timing is delayed. One of the advantages of this new combustion is that there is no need to devise any measures with regard to the formation of an overly rich air-fuel mixture, therefore there is great freedom in the structure of the combustion chamber, the arrangement of the fuel injectors and the spark plugs etc., the injection timing, and the ignition timing. If performing this new combustion, however, the EGR rate has to be made high, so the air-fuel mixture becomes difficult to ignite and accordingly sufficient consideration is required to ensure stable ignition of the air-fuel mixture by the spark plug 7.

In the embodiment shown in FIG. 2, the fuel is injected from a fuel injector 6 along the axial line of the cylinder in a conical shape. If fuel is injected in a conical shape in this way, a sub spray flow $F_2$ is formed around the main spray flow $F_1$ forming the conical shape. In this embodiment, the discharge gap of the spark plug 7 temperature at which the growth of the hydrocarbons stops midway to perform "first combustion", that is, low temperature combustion, while when the engine load is relatively high, "second combustion", that is, the conventionally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally performed combustion, means combustion where the amount of inert gas in the combustion chamber is smaller than the amount of inert gas where the amount of production of soot peaks.

Figure 7:
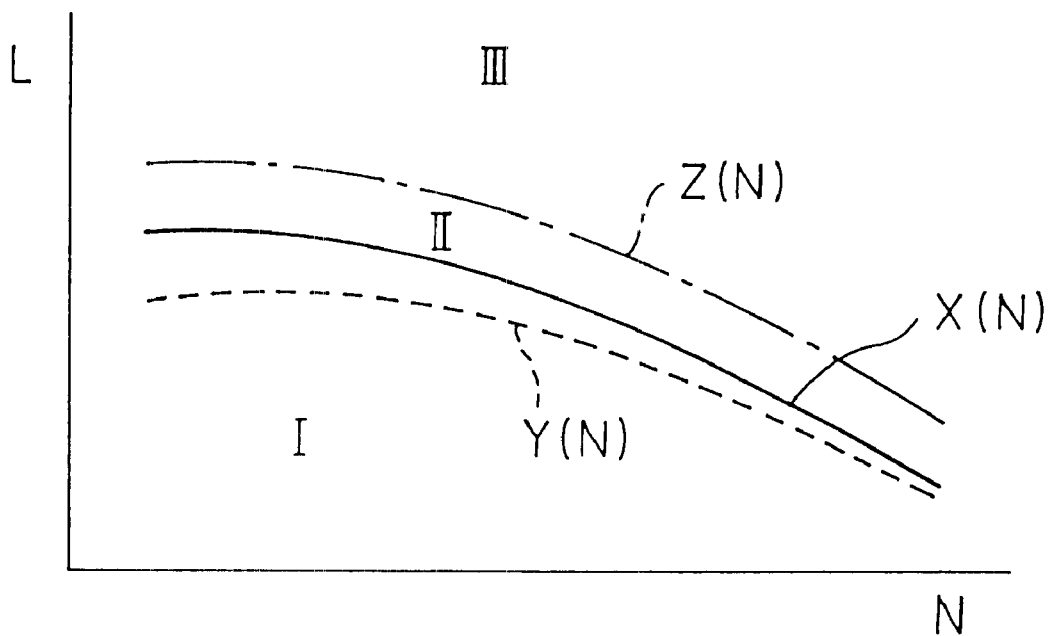
FIG. 7 is a view of a first operating region I, a second operating region II, and a third operating region III.

FIG. 7 shows a first operating region I where the first combustion, that is, the low temperature combustion, is performed and a second operating region II and third operating region III where the second combustion, that is, the combustion by the conventional combustion method, is performed. Note that in FIG. 7, the ordinate L shows the amount of depression of the accelerator pedal 40, that is, the required load, and the abscissa N shows the engine rotational speed. In the second operating region II, the fuel is injected twice, i.e., in the suction stroke and the compression stroke, namely, two-stage injection is performed, while in the third operating region III, the fuel is injected during the suction stroke, i.e., suction stroke injection is performed. These two-stage injection and suction stroke injection are injection methods used conventionally. Below, this combustion by two-stage injection and combustion by suction stroke injection will be referred to together as "second combustion".

In FIG. 7, X(N) shows a first boundary between the first operating region I and the second operating region is arranged inside the sub spray flow $F_2$ so as to prevent the ignition current from leaking due to deposition of carbon on the spark plug 7 and to ensure stable ignition of the air-fuel mixture. When fuel is being injected from a fuel injector 6, the air-fuel mixture of the sub spray flow $F_2$ is ignited by the spark plug 7.

The main spray flow $F_1$ and the sub spray flow $F_2$ are formed stably at all times regardless of the operating state of the engine. Therefore, by arranging the discharge gap of the spark plug 7 in the sub spray flow $F_2$, it is possible to reliably ignite the air-fuel mixture at all times. Note that even right after the completion of the fuel injection, the air-fuel mixture gathers around the discharge gap of the spark plug 7, so it is also possible to ignite the air-fuel mixture by the spark plug 7 right after completion of fuel injection.

If the injected fuel deposits on the inner wall surface of the cylinder bore, unburned hydrocarbons or smoke will be produced. Therefore, it is preferable not to make the penetration force of the injected fuel too strong so as to prevent the injected fuel from reaching the inner circumferential wall of the cylinder bore. Note that if the fuel is injected along the axial line of the cylinder as shown in FIG. 2, it will become harder for the injected fuel to reach the inner circumferential wall of the cylinder bore.

Note that the temperature of the fuel and its surrounding as at the time of combustion in the combustion chamber can only be suppressed to not more than a temperature where the growth of hydrocarbons stops midway at the time of a relatively low engine load where the amount of heat generated by the combustion is relatively small. Therefore, in this embodiment of the present invention, when the engine load is relatively low, the fuel injection timing is delayed and the temperature of the fuel and its surrounding gas at the time of combustion is suppressed to not more than a II, and Y(N) shows a second boundary between the first operating region I and the second operating region II. The change of operating regions from the first operating region I to the second operating region II is judged based on the first boundary X(N), while the change of operating regions from the second operating region II to the first operating region I is judged based on the second boundary Y(N).

That is, when the engine operating state is in the first operating region I where the low temperature combustion is being performed, if the required load L exceeds the first boundary X(N), which is a function of the engine rotational speed N, it is judged that the operating region has shifted to the second operating region II and second combustion is performed. Next, when the required load L becomes lower than the second boundary Y(N), which is a function of the engine rotational speed N, it is judged that the operating region has shifted to the first operating region I and the low temperature combustion is again performed.

Further, in FIG. 7, Z(N) shows a third boundary between the second operating region II and third operating region III.

Note that when the engine operating state is the first operating region I where low temperature combustion is performed, almost no soot is produced. Instead, the unburned hydrocarbons are exhausted from the combustion chamber 5 as a soot precursor or a form before that. At this time, the unburned hydrocarbons exhausted from the combustion chamber 5 are oxidized well by the catalyst 20 having an oxidation function.

As the catalyst 20, an oxidation catalyst, three-way catalyst, or $NO_x$ absorbent may be used. An $NO_x$ absorbent has the function of absorbing $NO_x$ when the air-fuel ratio in the combustion chamber 5 is lean and releasing $NO_x$ when the air-fuel ratio in the combustion chamber 5 becomes the stoichiometric air-fuel ratio or rich.

The $NO_x$ absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal.

An oxidation catalyst of course and also a three-way catalyst and $NO_x$ absorbent have an oxidation function, therefore as explained above it is possible to use a three-way catalyst or $NO_x$ absorbent as the catalyst 20.

Next, the control of the operation in the first operating region I, the second operating region II, and the third operating region III will be explained in brief with reference to FIG. 8 and FIG. 9.

Figure 8:
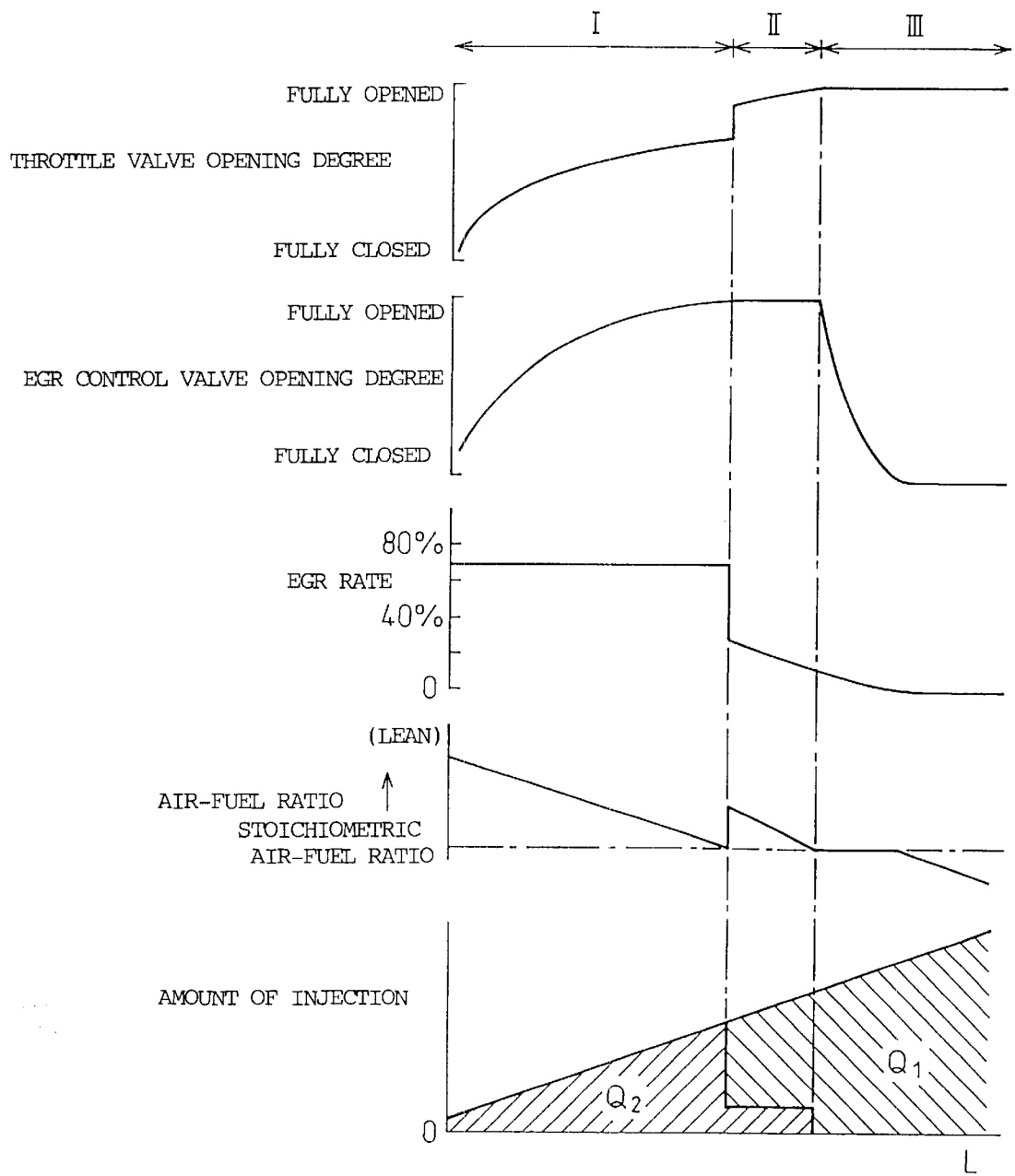
FIG. 8 is a view of an opening degree of a throttle valve etc.

FIG. 8 shows the opening degree of the throttle valve 17, the opening degree of the EGR control valve 24, the EGR rate, the air-fuel ratio, and the amount of injection with respect to the required torque L. As shown in FIG. 8, in the first operating region I with the low required load L, the opening degree of the throttle valve 17 is gradually increased from the fully closed state to the half opened state as the required load L becomes higher, while the opening degree of the EGR control valve 24 is gradually increased from close to the fully closed state to the fully opened state as the required load L becomes higher. Further, in the example shown in FIG. 8, in the first operating region I, the EGR rate is made about 70 percent and the air-fuel ratio is made a lean air-fuel ratio. Note that in this example, the air-fuel ratio is made leaner the smaller the required load L.

In other words, in the first operating region I, the opening degree of the throttle valve 17 and the opening degree of the EGR control valve 24 are controlled so that the EGR rate becomes about 70 percent and the air-fuel ratio becomes a lean air-fuel ratio in accordance with the required load L.

Figure 9:
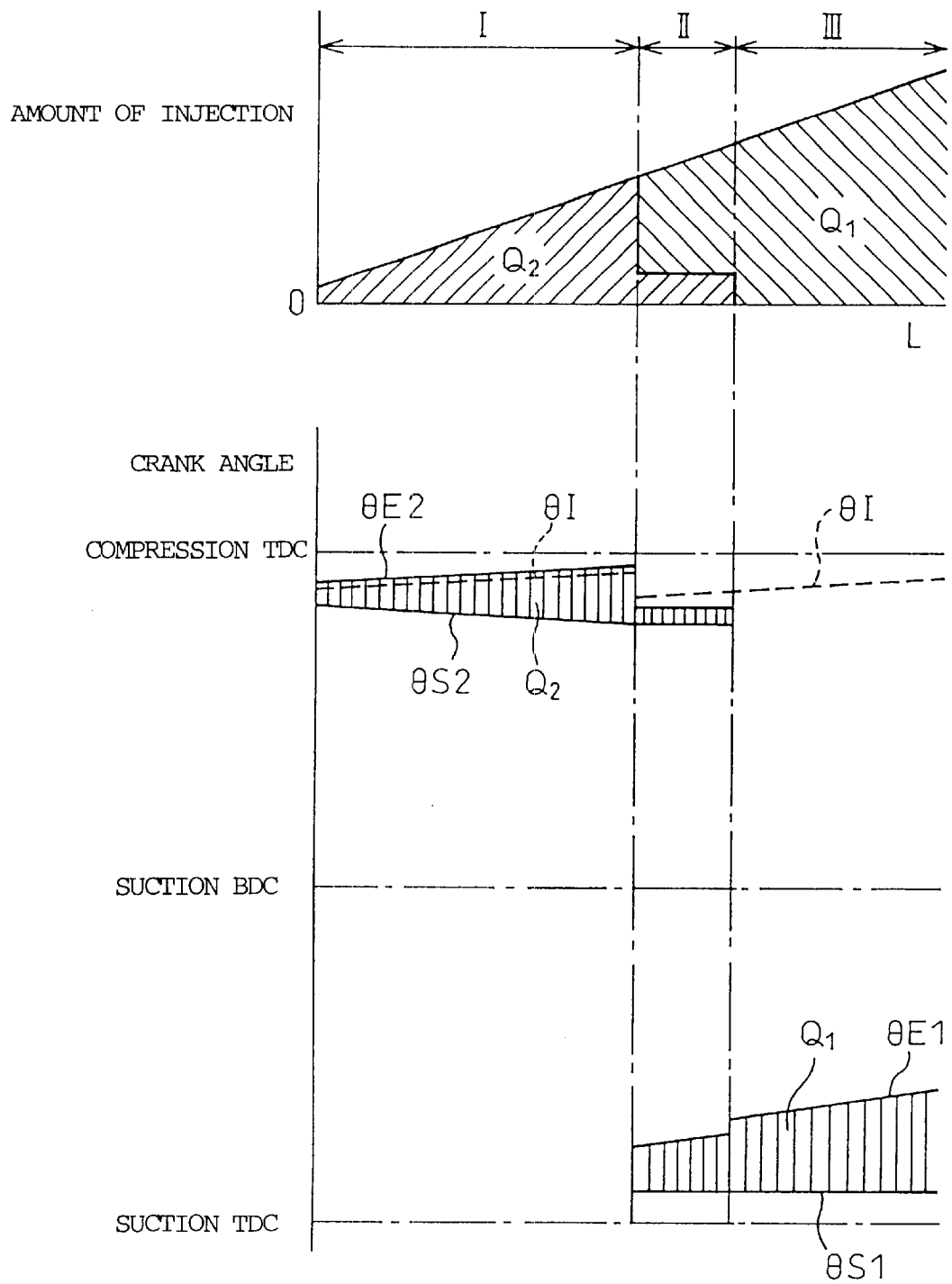
FIG. 9 is a view of an injection timing and ignition timing etc.

On the other hand, as shown in FIG. 9, in the first operating region I, the fuel injection $Q_2$ is performed between BTDC 25° to TDC in the compression stroke. In this case, the injection start timing θS2 becomes earlier the higher the required load L. The injection end timing (θE2 becomes later the higher the required load L.

Further, as shown in FIG. 9, the ignition timing timing θI is set to just before the completion of the fuel injection. Therefore, in this embodiment, when the fuel is being injected, the spark plug 7 is performing its ignition action. At that time the air-fuel mixture of the sub spray flow $F_2$ (FIG. 2) is ignited by the spark plug 7 and the flame of ignition ignites the air-fuel mixture of the main spray flow $F_1$. If the ignition action of the spark plug 7 is performed in this way during the fuel injection, the injected fuel will not sufficient disperse at that time and the center part of the main spray flow $F_1$ will become a considerably overly rich air-fuel mixture. Therefore, at that time, the overly rich air-fuel mixture will be burned by the flame of ignition, but almost no soot will be produced. Further, at this time, an extremely lean air-fuel ratio region will not be formed and therefore a large amount of unburned hydrocarbons will not be produced either.

Note that as shown in FIG. 8, during idling operation, the throttle valve 17 is made to close to close to the fully closed state. At this time, the EGR control valve 24 is also made to close to close to the fully closed state. If the throttle valve 17 is closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 17 can be closed to close to the fully closed state to suppress vibration in the engine body 1.

When the engine operating state is the first operating region I, almost no soot or $NO_x$ is produced and the soot precursor or hydrocarbons in a form before that contained in the exhaust gas are oxidized by the catalyst 20.

On the other hand, if the engine operating state changes from the first operating region I to the second operating region II, the opening degree of the throttle valve 17 is increased in a step-like manner from the half opened state to the fully opened state. At this time, in the example shown in FIG. 8, the EGR rate is reduced in a step-like manner from about 70 percent to less than 40 percent and the air-fuel ratio is increased in a step-like manner. That is, in the second operating region II, as shown in FIG. 9, a first fuel injection $Q_1$ is performed at the start of the suction stroke, while a second fuel injection $Q_2$ is performed at the end of the compression stroke.

At this time, the first fuel injection $Q_1$ forms a uniform lean air-fuel mixture filling the combustion chamber 5 as a whole, while the air-fuel mixture formed by the second fuel injection $Q_2$ is ignited by the spark plug 7. The flame of ignition becomes a source of ignition by which the lean air-fuel mixture filling the combustion chamber 5 is burned. In this way, the second fuel injection $Q_2$ is performed to form the source of ignition, so the amount of second fuel injection $Q_2$ is made a substantially constant amount regardless of the required load.

In the second operating region II, the ignition action by the spark plug 7 is performed immediately after the completion of the fuel injection. As explained above, immediately after the completion of the fuel injection, the air-fuel mixture gathers around the spark plug 7, therefore the air-fuel mixture is reliably ignited.

When shifting from the first operating region I to the second operating region II, the EGR rate is made sharply smaller so as to jump over the range of the EGR rate (FIG. 5) where a large amount of smoke is produced. At this time, if the fuel injection timing is left delayed as it is, there will be the risk of production of soot while the EGR rate is made sharply smaller to pass the range of EGR rate (FIG. 5) where a large amount of smoke is produced. In this embodiment of the present invention, however, when shifting from the first operating region I to the second operating region II, the injection timing of the majority of the fuel is made much earlier. That is, the majority of the fuel is injected in the suction stroke. If the majority of the fuel is injected in the suction stroke, soot is no longer produced regardless of the EGR rate. Therefore, there is no longer a risk of production of soot while the EGR rate is being made sharply smaller.

In the second operating region II, the opening degree of the throttle valve 17 is made gradually larger the higher the required load L. Therefore, the EGR gradually falls and the air-fuel ratio becomes gradually smaller toward the stoichiometric air-fuel ratio the higher the required load L.

Next, when the engine operating state changes from the second operating region II to the third operating region III, as shown in FIG. 8, the throttle valve 17 is substantially held in the fully opened state. Further, to make the air-fuel ratio the stoichiometric air-fuel ratio, the opening degree of the EGR control valve 24 is made smaller the higher the required load L. At this time, the air-fuel ratio is controlled by feedback to the stoichiometric air-fuel ratio based on the output signal of the air-fuel ratio sensor 22. After the EGR control valve 24 is fully closed, the air-fuel ratio is made richer the further higher the required load L.

As shown in FIG. 9, in the third operating region III, fuel injection $Q_1$ is performed at the start of the suction stroke. The injection start timing θS1 and the injection end timing θE1 of the fuel injection $Q_1$ performed at the start of the suction stroke, the injection start timing θS2 and injection end timing θE2 of the fuel injection $Q_2$ performed at the end of the compression stroke, and the ignition timing θI are functions of the required load L and the engine rotational speed N. The injection start timing θS1 and the injection end timing θE1 of the fuel injection $Q_1$, the injection start timing θS2 and injection end timing θE2 of the fuel injection $Q_2$, and the ignition timing θI are stored as functions of the required load L and the engine rotational speed in the ROM 32 in advance in the form of maps.

Figure 10:
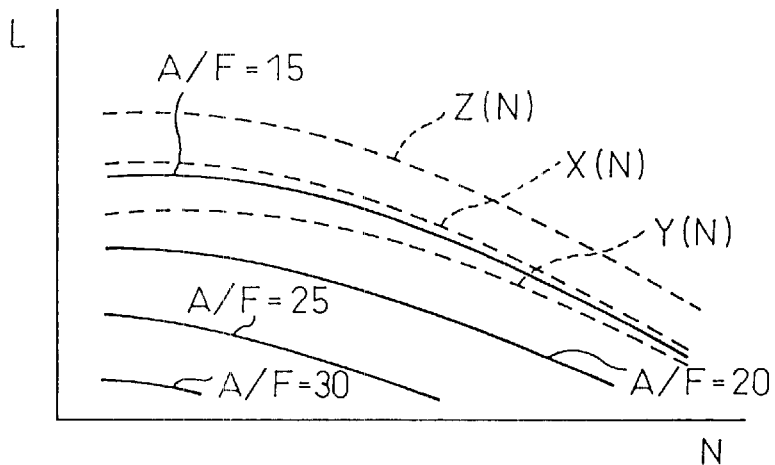
FIG. 10 is a view of an air-flow ratio in the first operating region I.

FIG. 10 shows the air-fuel ratio A/F in the first operating region I. In FIG. 10, the curves shown by A/F=15, A/F=20, A/F=25, and A/F=30 show when the air-fuel ratio is 15, 20, 25, and 30, respectively. The air-fuel ratios between the curves are determined by proportional distribution. As shown in FIG. 10, in the first operating region I, the air-fuel ratio becomes lean. Further, in the first operating region I, the air-fuel ratio A/F is made leaner the lower the required load L.

That is, the lower the required load L, the smaller the amount of heat generated by the combustion. Therefore, even if reducing the EGR rate the lower the required load L, low temperature combustion becomes possible. If the EGR rate is reduced, the air-fuel ratio becomes larger and therefore, as shown in FIG. 10, the air-fuel ratio A/F is made larger the lower the required load L. The larger the air-fuel ratio A/F, the more the fuel consumption efficiency is improved. Therefore, to make the air-fuel ratio as lean as possible, in this embodiment of the present invention, the air-fuel ratio A/F is made larger the lower the required load L.

Figure 11A:
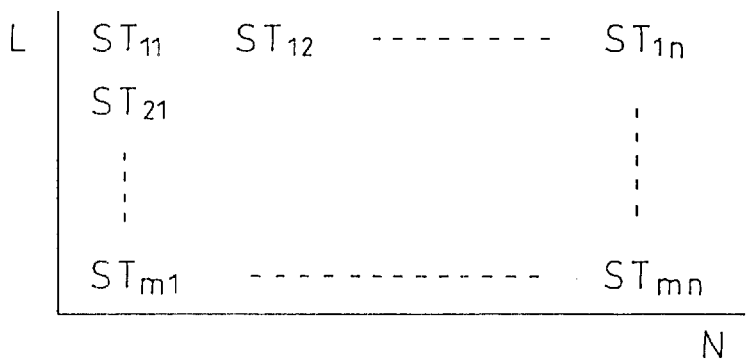
FIGS. 11A and 11B are maps of the target opening degrees of the throttle valve etc.
Figure 11B:
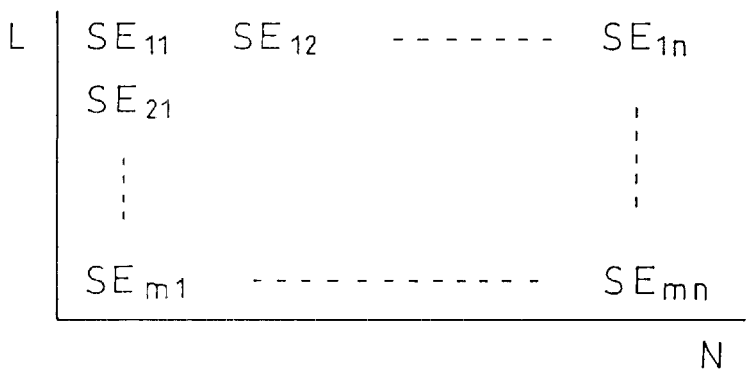

Note that the target opening degree ST of the throttle valve 17 required for making the air-fuel ratio the target air-fuel ratio shown in FIG. 10 is stored in advance in the ROM 32 in the form of a map as a function of the required load L and the engine rotational speed N as shown in FIG. 11A, while the target opening degree SE of the EGR control valve 24 required for making the air-fuel ratio the target air-fuel ratio shown in FIG. 10 is stored in advance in the ROM 32 in the form of a map as a function of the required load L and the engine rotational speed N as shown in FIG. 11B.

Figure 12:
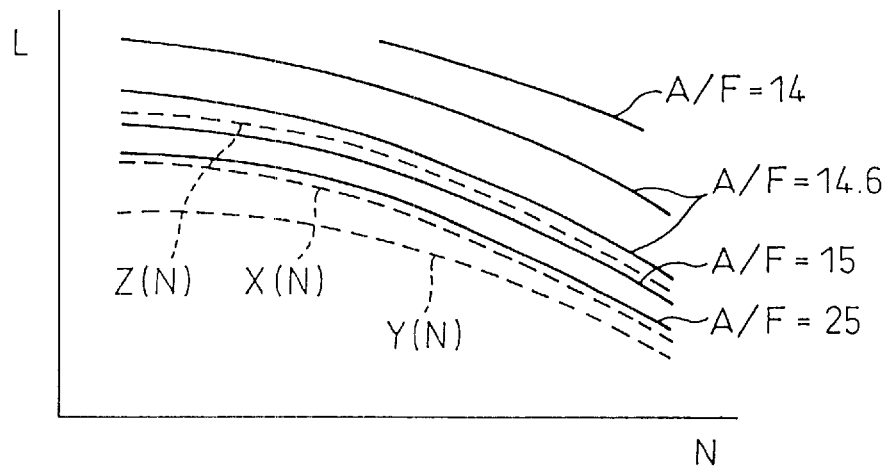
FIG. 12 is a view of the air-flow ratio in second combustion.

FIG. 12 shows the target air-fuel ratio when second-combustion, that is, ordinary combustion by the conventional method of combustion, is performed. Note than in FIG. 12, the curves shown by A/F=14, A/F=14.6, A/F=15, and A/F=25 show the target air-fuel ratios 14, 14.6, 15, and 25. As will be understood from FIG. 12, in the second operating region II between the first boundary X(N) and the third boundary Z(N), the air-fuel ratio A/F becomes leaner the lower the required load L. Further, in the low load side region of the third operating region III with the larger required load L than the third boundary Z(N), the air-fuel ratio A/F is made 14.6, that is, the stoichiometric air-fuel ratio.

Figure 13A:
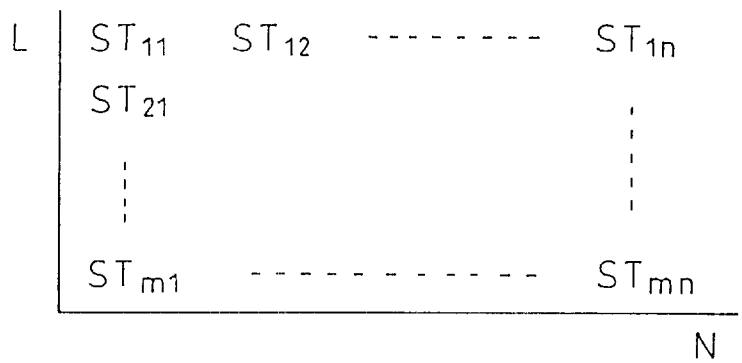
FIGS. 13A and 13B are views of maps of the target opening degrees of a throttle valve etc.
Figure 13B:
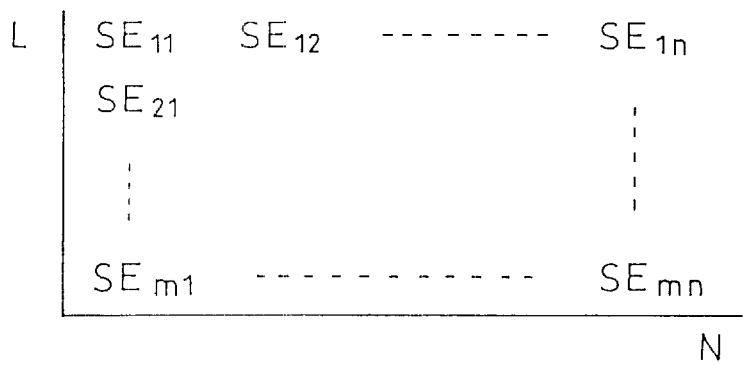

Note that the target opening degree ST of the throttle valve 17 required for making the air-fuel ratio the target air-fuel ratio shown in FIG. 12 is stored in advance in the ROM 32 in the form of a map as a function of the required load L and the engine rotational speed N as shown in FIG. 13A, while the target opening degree SE of the EGR control valve 24 required for making the air-fuel ratio the target air-fuel ratio shown in FIG. 12 is stored in advance in the ROM 32 in the form of a map as a function of the required load L and the engine rotational speed N as shown in FIG. 13B.

Next, the operational control will be explained with reference to FIG. 14.

Figure 14:
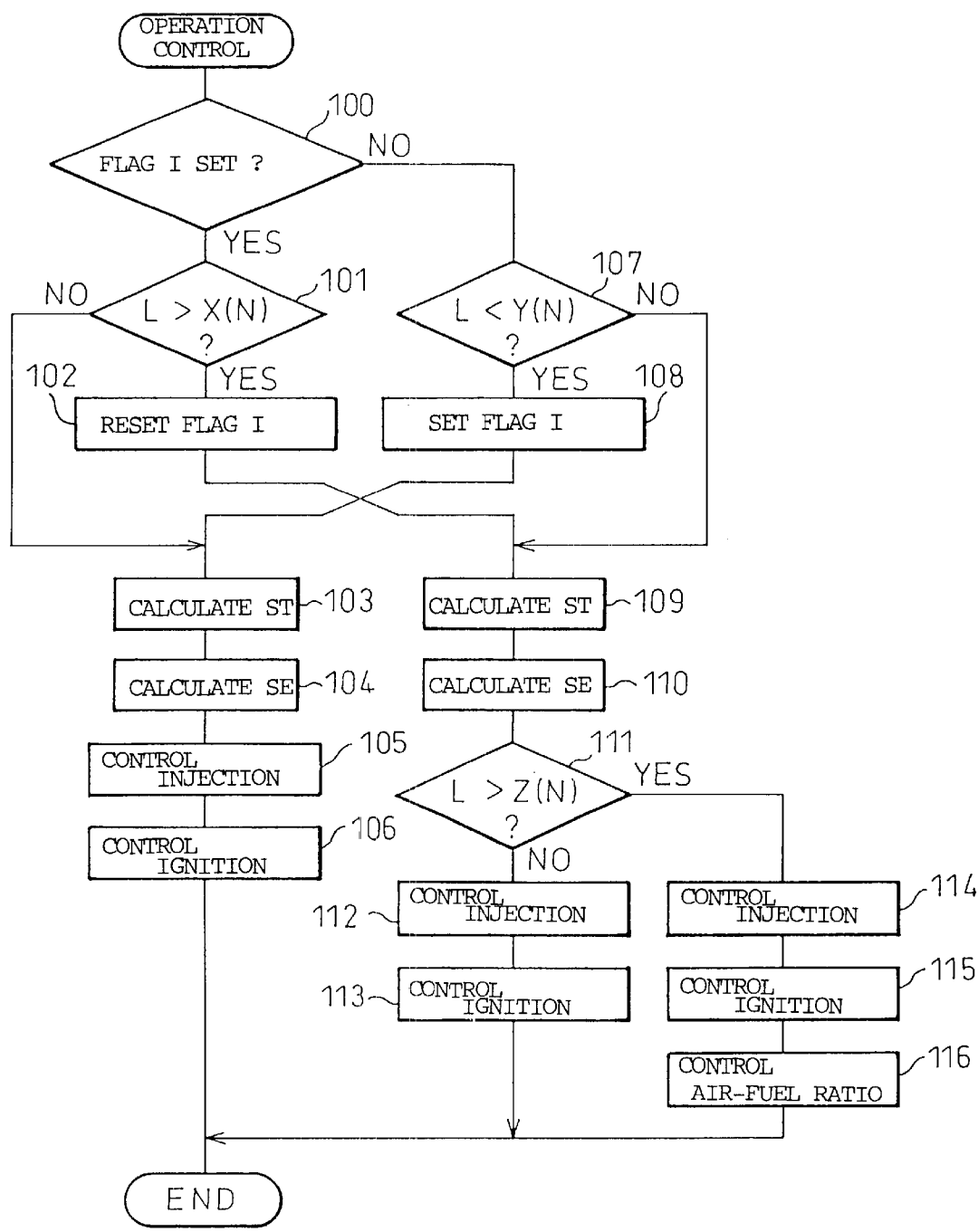
FIG. 14 is a flow chart of the control of the engine operation.

Referring to FIG. 14, first, at step 100, it is judged if a flag I showing that the engine operating region is the first operating region I is set or not. When the flag I is set, that is, when the engine operating region is the first operating region I, the routine proceeds to step 101, where it is judged if the required load L has become larger than the first boundary X(N). When L≦X(N), the routine proceeds to step 103, where low temperature combustion is performed.

That is, at step 103, the target opening degree ST of the throttle valve 17 is calculated from the map shown in FIG. 11A and the opening degree of the throttle valve 17 is made the target opening degree ST. Next, at step 104, the target opening degree SE of the EGR control valve 24 is calculated from the map shown in FIG. 11B and the opening degree of the EGR control valve 24 is made this target opening degree SE. Next, at step 105, the injection start timing θS2 and injection end timing θE2 of the fuel injection $Q_2$ performed at the end of the compression stroke are calculated from the map stored in the ROM 32 based on the required load L and the engine rotational speed. The fuel injection is controlled based on these. Next, at step 106, the ignition timing θI is calculated from the map stored in the ROM 32 based on the required load L and the engine rotational speed and the ignition timing is controlled based on this.

On the other hand, when it is judged at step 101 that L>X(N), the routine proceeds to step 102, where the flag I is reset, then the routine proceeds to step 109, where the second combustion is performed.

That is, at step 109, the target opening degree ST of the throttle valve 17 is calculated from the map shown in FIG. 13A and the opening degree of the throttle valve 17 is made the target opening degree ST. Next, at step 110, the target opening degree SE of the EGR control valve 24 is calculated from the map shown in FIG. 13B and the opening degree of the EGR control valve 24 is made this target opening degree SE. Next, at step 111, it is judged if the required load L is higher than the third boundary Z(N) or not. When L≦Z(N), that is, when the engine operating state is the second operating region II, the routine proceeds to step 112, where two-stage injection is performed.

That is, at step 112, the injection start timing θS1 and injection end timing θE1 of the fuel injection $Q_1$ performed at the start of the suction stroke and the injection start timing θS2 and injection end timing θE2 of the fuel injection $Q_2$ performed at the end of the compression stroke are calculated from the map stored in the ROM 32 based on the required load L and the engine rotational speed. The fuel injection is controlled based on these. Next, at step 113, the ignition timing θI is calculated from the map stored in the ROM 32 based on the required load L and the engine rotational speed and the ignition timing is controlled based on this.

On the other hand, when it is judged at step 111 that L>Z(N), that is, when the engine operating state is the third operating region III, the routine proceeds to step 114, where the normal uniform air-fuel mixture combustion is performed.

That is, at step 114, the injection start timing θS1 and injection end timing θE1 of the fuel injection $Q_1$ performed at the start of the suction stroke are calculated from the map stored in the ROM 32 based on the required load L and the engine rotational speed. The fuel injection is controlled based on these. Next, at step 115, the ignition timing θI is calculated from the map stored in the ROM 32 based on the required load L and the engine rotational speed and the ignition timing is controlled based on this. Next, at step 116, when the target air-fuel ratio is the stoichiometric air-fuel ratio, the opening degree of the EGR control valve 24 is controlled so that the air-fuel ratio becomes the stoichiometric air-fuel ratio based on the-output signal of the air-fuel ratio sensor 22.

When the flag I is reset, at the next processing cycle, the routine proceeds from step 100 to step 107, where it is judged if the required load L has become lower than the second boundary Y(N) or not. When L≧Y(N), the routine proceeds to step 109, where the second combustion is performed.

On the other hand, when it is judged at step 107 that L<Y(N), the routine proceeds to step 108, where the flag I is set, then the routine proceeds to step 103, where low temperature combustion is performed.

Next, an explanation will be given of the case of using an $NO_x$ absorbent as the catalyst 20.

If the ratio of the air and fuel (hydrocarbons) supplied into the engine intake passage, combustion chamber 5, and exhaust passage upstream of the $NO_x$ absorbent 20 is referred to as the air fuel ratio of the exhaust gas flowing into the $NO_x$ absorbent 20, then the $NO_x$ absorbent 20 performs an $NO_x$ absorption and release action in which it absorbs $NO_x$ when the air-fuel ratio of the inflowing exhaust gas is lean while releases the absorbed $NO_x$ when the air-fuel ratio of the inflowing exhaust gas becomes the stoichiometric air-fuel ratio or rich. Note that when fuel (hydrocarbons) to air is not supplied to the exhaust passage upstream of the $NO_x$ absorbent 20, the air-fuel ratio of the inflowing exhaust gas matches with the air-fuel ratio in the combustion chamber 5. Therefore, in this case, as explained above, the $NO_x$ absorbent 20 absorbs $NO_x$ when the air-fuel ratio in the combustion chamber 5 is lean while releases the absorbed $NO_x$ when the air-fuel ratio in the combustion chamber 5 becomes the stoichiometric air-fuel ratio or rich.

If this $NO_x$ absorbent 20 is placed in the engine exhaust passage, the $NO_x$ absorbent 20 will in actuality perform an $NO_x$ absorption and release action, but there are portions of the detailed mechanism of this absorption and release action which are still not clear. This absorption and release action, however, is considered to be performed by the mechanism shown in FIGS. 15A and 15B. Next, this mechanism will be explained taking as an example the case of carrying platinum Pt and barium Ba on the carrier, but the same mechanism applies even if using another precious metal and alkali metal, alkali earth, or rare earth.

Figure 15A:
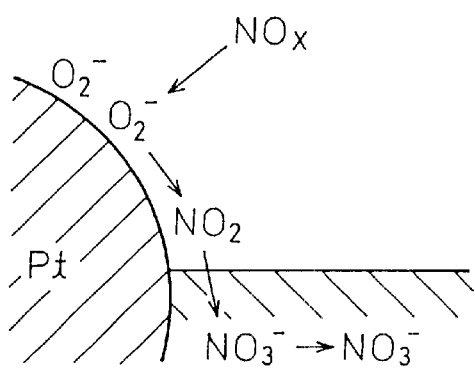
FIGS. 15A and 15B are views for explaining the action of absorption and release of $NO_x$.

That is, when the inflowing exhaust gas becomes lean, the concentration of oxygen in the inflowing exhaust gas increases. At this time, as shown in FIG. 15A, the oxygen $O_2$ deposits on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO+O_2 \rightarrow 2NO_2$). Next, part of the produced $NO_2$ is oxidized on the platinum Pt and absorbed in the absorbent and diffuses inside the absorbent in the form of nitrate ions $NO_3^-$ as shown in FIG. 15A while bonding with the barium oxide BaO. The $NO_x$ is absorbed in the $NO_x$ absorbent 20 in this way. So long as the concentration of oxygen in the inflowing exhaust gas is high, $NO_2$ is produced on the surface of the platinum Pt. So long as the $NO_x$ absorption capability of the absorbent does not become saturated, the $NO_2$ is absorbed in the absorbent and nitrate ions $NO_3^-$ are produced.

Figure 15B:
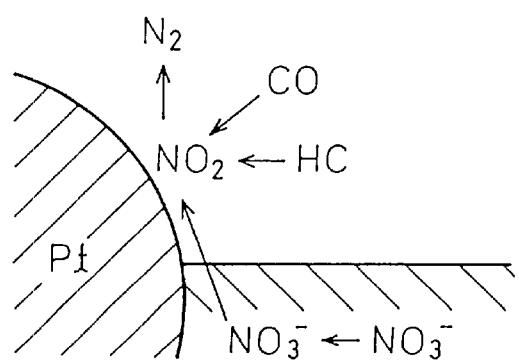

On the other hand, when the air-fuel ratio of the inflowing exhaust gas is made rich, the concentration of oxygen in the inflowing exhaust gas falls and as a result the amount of production of $NO_2$ on the surface of the platinum Pt falls. If the amount of production of $NO_2$ falls, the reaction proceeds in the reverse direction ($NO_3^- \rightarrow NO_2$) and therefore the nitrate ions $NO_3^-$ in the absorbent are released from the absorbent in the form of $NO_2$. At this time, the $NO_x$ released from the $NO_x$ absorbent 20 reacts with the large amount of unburnt hydrocarbons and carbon monoxide contained in the inflowing exhaust gas to be reduced as shown in FIG. 15B.

In this way, when there is no longer any $NO_2$ present on the surface of the platinum PT, $NO_2$ is successively released from the absorbent. Therefore, if the air-fuel ratio of the inflowing exhaust gas is made rich, the $NO_x$ will be released from the $NO_x$ absorbent 20 in a short time and, further, the released $NO_x$ will be reduced, so no $NO_x$ will be discharged into the atmosphere.

Note that in this case, even if the air-fuel ratio of the inflowing exhaust gas is made the stoichiometric air-fuel ratio, $NO_x$ will be released from the $NO_x$ absorbent 20. When the air-fuel ratio of the inflowing exhaust gas is made the stoichiometric air-fuel ratio, however, the $NO_x$ will be released from the $NO_x$ absorbent 20 only gradually, so a somewhat long time will be required for having all of the $NO_x$ absorbed in the $NO_x$ absorbent 20 be released.

Figure 16A:
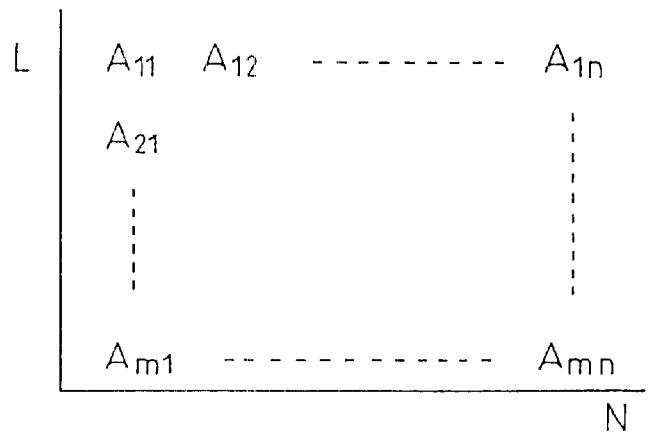
FIG. 16A, FIG. 16B, and FIG. 16C are maps of the amount of absorption and release of $NO_x$.
Figure 16B:
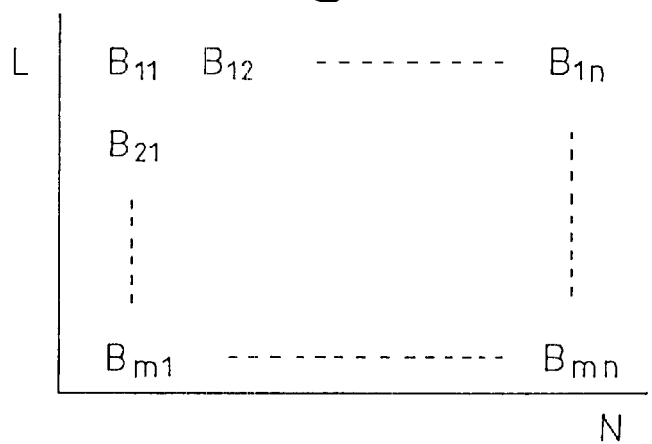

There are, however, limits to the $NO_x$ absorption capability of the $NO_x$ absorbent 20. It is necessary to release the $NO_x$ from the $NO_x$ absorbent 20 before the $NO_x$ absorption capability of the $NO_x$ absorbent 20 becomes saturated. Therefore, it is necessary to estimate the amount of $NO_x$ absorbed in the $NO_x$ absorbent 20. Therefore, in this embodiment of the present invention, the amount of $NO_x$ absorption A per unit time when the first combustion is being performed is found in advance in the form of the map shown in FIG. 16A as a function of the required load L and the engine rotational speed N, while the amount of $NO_x$ absorption B per unit time when the second combustion is being performed is found in advance in the form of the map shown in FIG. 16B as a function of the required load L and the engine rotational speed $N_x$. The amount $\Sigma NOX$ of $NO_x$ absorbed in the $NO_x$ absorbent 20 is estimated by cumulative addition of these amounts of $NO_x$ absorption A and B per unit time. Note that in this case the amount of $NO_x$ absorption A is extremely small.

On the other hand, when the engine operating state is the third operating region III, the air-fuel ratio is made the stoichiometric air-fuel ratio or rich. At this time, the $NO_x$ is released from the $NO_x$ absorbent 20. Therefore, in this embodiment of the present invention, the amount C of release of $NO_x$ per unit time is calculated from the map shown in FIG. 16C as a function of the required load L and the engine rotational speed N, and the amount of $NO_x$ release C is subtracted from the amount $\Sigma NOX$ of the absorption of $NO_x$ when tne air-fuel ratio is the stoichiometric air-fuel ratio or rich.

In this embodiment according to the present invention, when the amount $\Sigma NOX$ of $NO_x$ absorption exceeds a predetermined maximum allowable value, the $NO_x$ is made to be released from the $NO_x$ absorbent 20. This will be explained next referring to FIG. 17.

Figure 17:
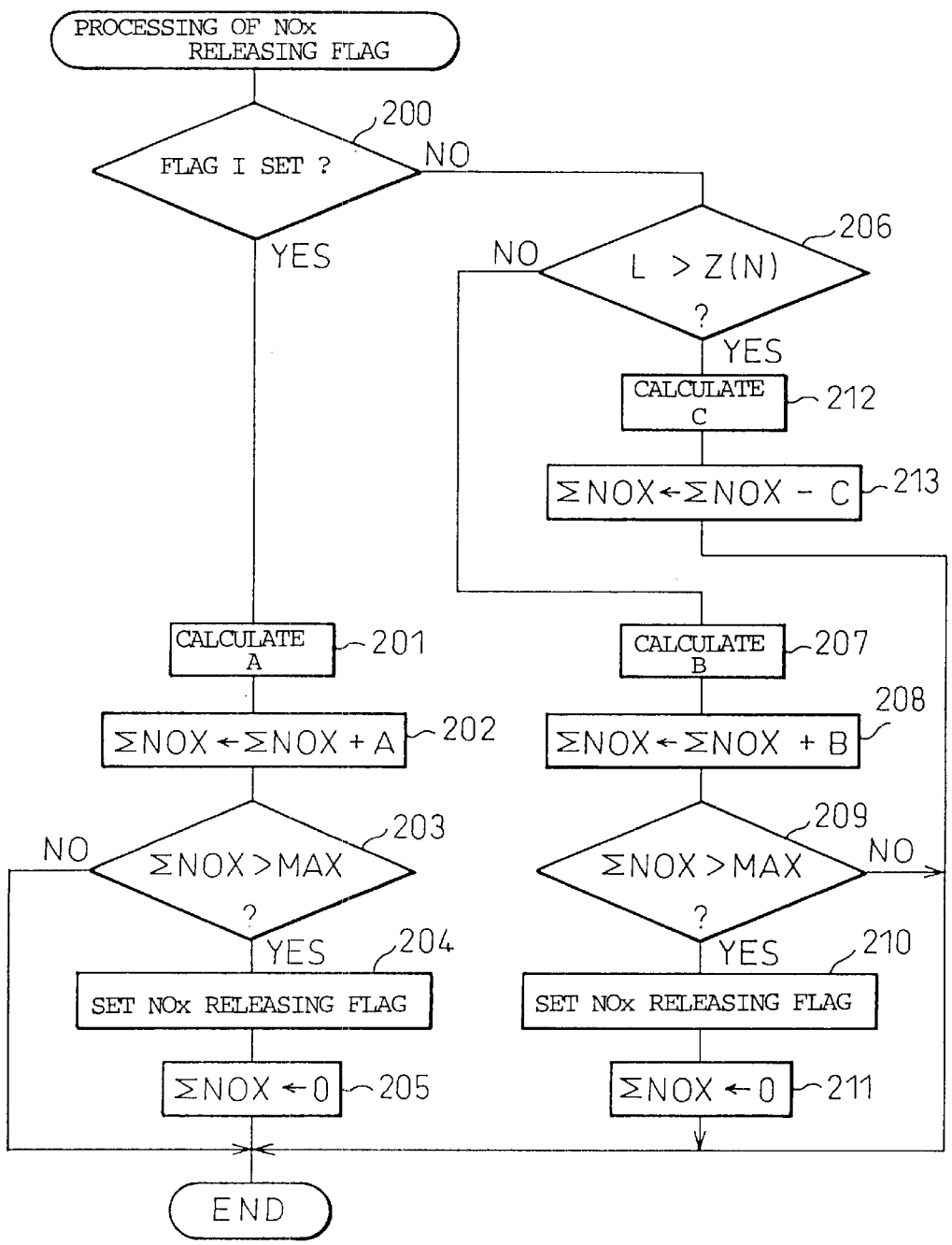
FIG. 17 is a flow chart of the processing of an $NO_x$ release flag.

FIG. 17 shows the processing routine of the $NO_x$ releasing flag set when $NO_x$ is to be released from the NOx absorbent 20. This routine is executed by interruption every predetermined time interval.

Referring to FIG. 17, first, at step 200, it is judged if a flag I showing that the engine operating region is the first operating region I is set or not. When the flag I is set, that is, when the engine operating region is the first operating region I, the routine proceeds to step 201, where the amount of absorption A of $NO_x$ per unit time is calculated from the map shown in FIG. 16A. Next, at step 202, A is added to the amount $\Sigma NOX$ of absorption of $NO_x$. Next, at step 203, it is determined if the amount $\Sigma NOX$ of absorption of $NO_x$ has exceeded a maximum allowable value MAX. If $\Sigma NOX>MAX$, the routine proceeds to step 204, where the $NO_x$ releasing flag is set for a predetermined time. Next, at step 205, $\Sigma NOX$ is made zero.

On the other hand, when it is determined at step 200 that the flag I has been reset, the routine proceeds to step 206, where it is judged if the required load L is higher than the third boundary Z(N). When $L \leq Z(N)$, that is, when the engine operating state is the second operating region II, the routine proceeds to step 207, where the amount B of absorption of $NO_x$ per unit time is calculated from the map shown in FIG. 16B. Next, at step 208, B is added to the amount $\Sigma NOX$ of the absorption of $NO_x$. Next, at step 209, it is determined if the amount $\Sigma NOX$ of the absorption of $NO_x$ has exceeded the maximum allowable value MAX. When $\Sigma NOX>MAX$, the routine proceeds to step 210, where the $NO_x$ releasing flag 1 is set for a predetermined time, then $\Sigma NOX$ is made zero at step 211.

Figure 16C:
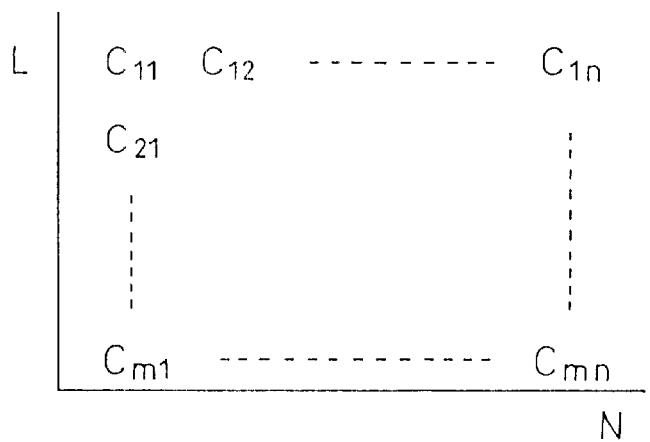

On the other hand, when it is judged at step 206 that $L>Z(N)$, that is, when the engine operating state is the third operating region III, the routine proceeds to step 212, where the amount C of release of $NO_x$ per unit time is calculated from the map shown in FIG. 16C. Next, at step 213, C is subtracted from the amount $\Sigma NOX$ of the absorption of $NO_x$.

Next, an explanation will be made of the operation control referring to FIG. 18.

Figure 18:
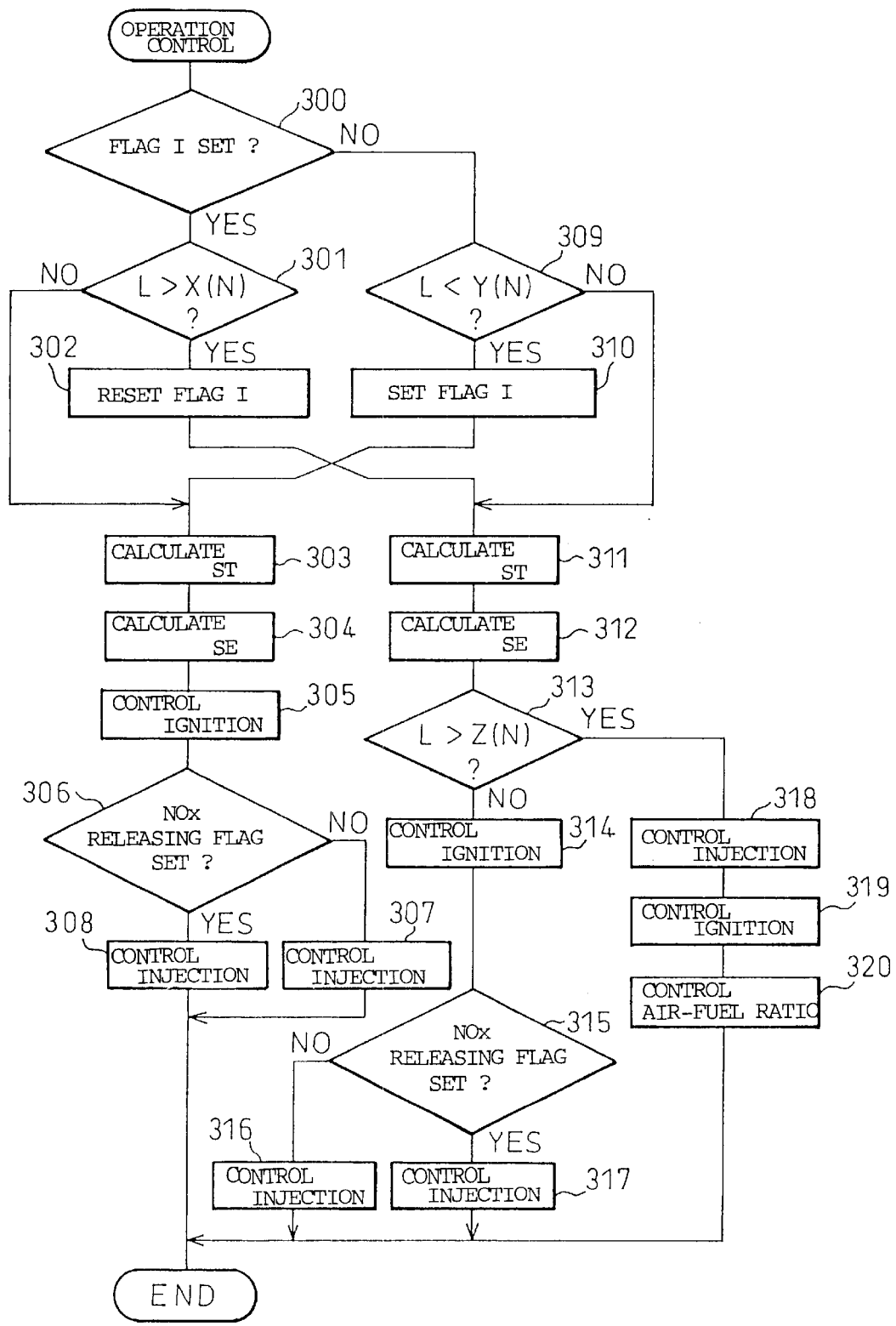
FIG. 18 is a flow chart of another embodiment of control of the engine operation.

Referring to FIG. 18, first, at step 300, it is judged if a flag I showing that the engine operating region is the first operating region I is set or not. When the flag I is set, that is, when the engine operating region is the first operating region I, the routine proceeds to step 301, where it is judged if the required load L has become larger than the first boundary X(N). When $L \leq X(N)$, the routine proceeds to step 303, where low temperature combustion is performed.

That is, at step 303, the target opening degree ST of the throttle valve 17 is calculated from the map shown in FIG. 11A and the opening degree of the throttle valve 17 is made the target opening degree ST. Next, at step 304, the target opening degree SE of the EGR control valve 24 is calculated from the map shown in FIG. 11B and the opening degree of the EGR control valve 24 is made this target opening degree SE. Next, at step 305, the ignition timing θI is calculated from the map stored in the ROM 32 based on the required load L and the engine rotational speed and the ignition timing is controlled based on this.

Next, at step 306, it is judged if the $NO_x$ releasing flag has been set or not. When the $NO_x$ releasing flag has not been set, the routine proceeds to step 307, where the injection start timing θS2 and injection-end timing θE2 of the fuel injection $Q_2$ performed at the end of the compression stroke are calculated from the map stored in the ROM 32 based on the required load L and the engine rotational speed. The fuel injection is controlled based on these. At this time, low temperature combustion is performed under a lean air-fuel ratio.

As opposed to this, when it is judged at step 306 that the $NO_x$ releasing flag has been set, the routine proceeds to step 308, where the injection start timing θS2 and injection end timing θE2 of the fuel injection $Q_2$ performed at the end of the compression stroke are calculated from the map stored in the ROM 32 based on the required load L and the engine rotational speed, then the amount of the fuel injection $Q_2$ performed at the end of the compression stroke is increased to make the air-fuel ratio rich by processing to make the injection start timing θS2 calculated from the map earlier. As a result, the air-fuel ratio is made rich under the first combustion while the $NO_x$ releasing flag is set.

On the other hand, when it is judged at step 301 that $L>X(N)$, the routine proceeds to step 302, where the flag I is reset, then the routine proceeds to step 311, where the second combustion is performed.

That is, at step 311, the target opening degree ST of the throttle valve 17 is calculated from the map shown in FIG. 13A and the opening degree of the throttle valve 17 is made the target opening degree ST. Next, at step 312, the target opening degree SE of the EGR control valve 24 is calculated from the map shown in FIG. 13B and the opening degree of the EGR control valve 24 is made this target opening degree SE. Next, at step 313, it is judged if the required load L is higher than the third boundary Z(N) or not. When L≦Z(N), that is, when the engine operating state is the second operating region II, the routine proceeds to step 314, where two-stage injection is performed.

That is, first the ignition timing θI is calculated from the map stored in the ROM 32 based on the required load L and the engine rotational speed and the ignition timing is controlled based on this. Next, at step 315, it is judged if the $NO_x$ releasing flag has been set or not. When the $NO_x$ releasing flag has not been set, the routine proceeds to step 316, where the injection start timing θS1 and the injection end timing θE1 of the fuel injection $Q_1$ performed at the start of the suction stroke and the injection start timing θS2 and the injection end timing θE2 of the fuel injection $Q_2$ performed at the end of the compression stroke are calculated from the map stored in the ROM 32 based on the required load L and the engine rotational speed. The fuel injection is controlled based on these. At this time, two-stage injection is performed under a lean air-fuel ratio.

On the other hand, when it is judged at step 315 that the $NO_x$ releasing flag has been set, the routine proceeds to step 317, where the injection start timing θS1 and injection end timing θE1 of the fuel injection $Q_1$ performed at the start of the suction stroke and the injection start timing θS2 and injection end timing θE2 of the fuel injection $Q_2$ performed at the end of the compression stroke are calculated from the map stored in the ROM 32 based on the required load L and the engine rotational speed, then the amount of the fuel injection $Q_1$ performed at the start of the suction stroke is increased to make the air-fuel ratio rich by processing to make the injection start timing θS1 calculated from the map earlier. As a result, the air-fuel ratio is made rich under the second combustion while the $NO_x$ releasing flag is set.

On the other hand, when it is judged at step 313 that L>Z(N), that is, when the engine operating state is the third operating region III, the routine proceeds to step 318, where ordinary uniform air-fuel mixture combustion is performed.

That is, at step 318, the injection start timing θS1 and the injection end timing θE1 of the fuel injection $Q_1$ performed at the start of the suction stroke are calculated from the map stored in the ROM 32 based on the required load L and the engine rotational speed. The fuel injection is controlled based on these. Next, at step 319, the ignition timing θI is calculated from the map stored in the ROM 32 based on the required load L and the engine rotational speed. Next, at step 320, when the target air-fuel ratio is the stoichiometric air-fuel ratio, the opening degree of the EGR control valve 24 is controlled so that the air-fuel ratio becomes the stoichiometric air-fuel ratio based on the output signal of the air-fuel ratio sensor 22.

When the flag I is reset, at the next processing cycle, the routine proceeds from step 300 to step 309, where it is judged if the required load L has become lower than the second boundary Y(N) or not. When L≧Y(N), the routine proceeds to step 311, where the second combustion is performed.

On the other hand, when it is judged at step 309 that L<Y(N), the routine proceeds to step 310, where the flag I is set, then the routine proceeds to step 303, where low temperature combustion is performed.

Figure 19:
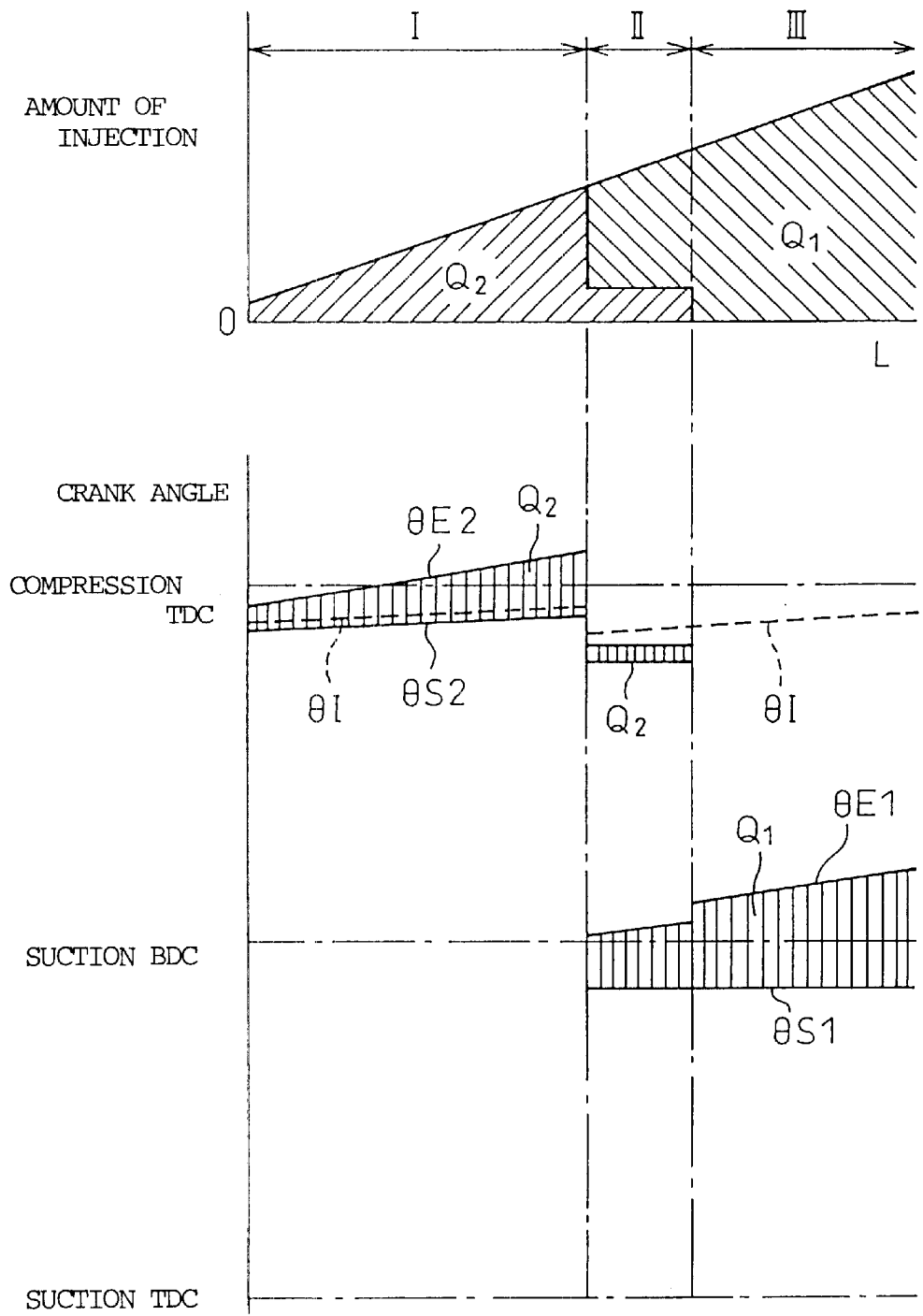
FIG. 19 is a view of the injection timing and ignition timing in another embodiment.

FIG. 19 shows an embodiment where the ignition action of the spark plug 7 is performed immediately after the start of the fuel injection $Q_2$ at the end of the compression stroke when the engine operating state is the first operating region I, that is, when low temperature combustion is being performed. That is, in this embodiment, the ignition timing θI is set to the same timing as the ignition timing θI of the embodiment shown in FIG. 9, while the injection start timing θS2 is set to immediately before the ignition timing θI.

If setting the ignition timing θI in this way, the injected fuel is ignited immediately after the start of injection and the flame of ignition causes the fuel injected after it to be successively burned fairly much when being injected. Therefore, in this embodiment, no lean air-fuel mixture is formed, so there is no production of unburned hydrocarbons due to combustion of a lean air-fuel mixture. Therefore, in this embodiment as well, it is possible to prevent the production of soot and $NO_x$ and reduce the amount of fuel consumption.

Figure 20:
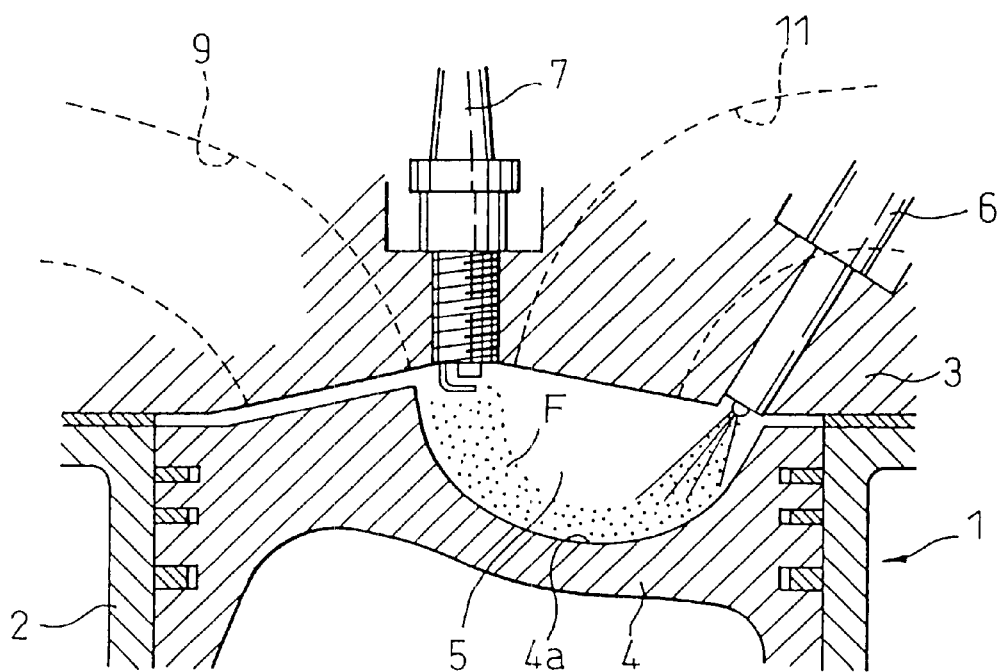
FIG. 20 is an overall view of another embodiment of a spark ignition type internal combustion engine.

FIG. 20 shows another embodiment of the internal combustion engine.

In this embodiment, the spark plug 7 is arranged at the center of the inner wall surface of the cylinder head 3, the fuel injector 6 is arranged near the inner circumferential wall of the cylinder head 3, and a semispherically shaped groove 4a extending from below the fuel injector 6 to below the spark plug 7 is formed in the top surface of the piston 4. When the engine operating state is the first operating region I, that is, when low temperature combustion is being performed, the fuel is injected from the fuel injector 6 at the end of the compression stroke by a small angle of spray toward the inside of the groove 4a so as to follow the bottom surface of the groove 4a. This injected fuel F is guided by the bottom surface of the groove 4a and is raised from below the spark plug 7 toward the spark plug 7.

Figure 21:
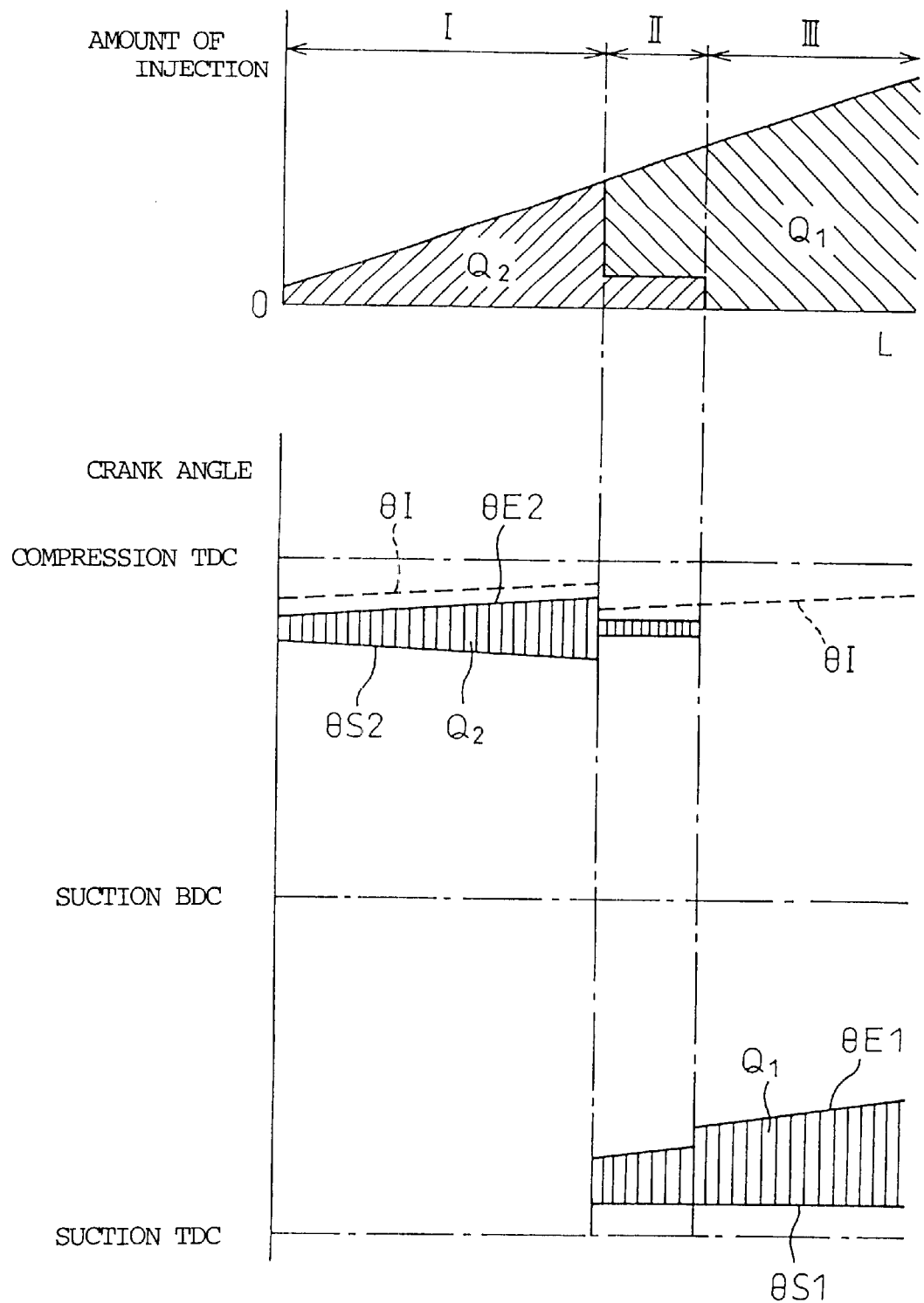
FIG. 21 is a view of the injection timng and ignition timing etc.

In this embodiment, it takes time for the injected fuel to reach around the spark plug 7, so the ignition action of the spark plug 7 is performed after the completion of the injection. Therefore, as shown in FIG. 21, in the first operating region I, the ignition timing θI becomes later than the injection end timing θE2 of the fuel injection $Q_2$.

In this embodiment, the injected fuel has to reach around the spark plug 7 regardless of the amount of fuel injection and the injected fuel F must not disperse too much before the ignition action of the spark plug 7. Therefore, in this embodiment, it is preferable to inject the spray-of fuel with a small angle of spray from the fuel injector 6 and with a large penetration force.

As explained above, according to the present invention, it is possible to prevent the production of soot and $NO_x$ and to reduce the amount of fuel consumption.

What is claimed is:

1. An internal combustion engine provided with a spark plug for igniting fuel injected into a combustion chamber, wherein an amount of soot produced peaks when an amount of inert gas in the combustion chamber is increased and fuel injection timing in a compression stroke is delayed, and wherein, switching means is provided for selectively switching between a first combustion where substantially no soot is produced as the amount of inert gas in the combustion chamber exceeds the amount of inert gas at which the amount of soot produced peaks and a second combustion where the amount of inert gas in the combustion chamber is smaller than the amount of inert gas at which the production of soot peaks.

2. An internal combustion engine as set forth in claim 1, wherein the fuel injection timing is set to a timing where a peak of an amount of production of soot appears when the amount of inert gas is increased.

3. An internal combustion engine as set forth in claim 2, wherein the fuel injection timing is set to the end of the compression stroke.

4. An internal combustion engine as set forth in claim 3, wherein an ignition action of the spark plug is performed during the fuel injection.

5. An internal combustion engine as set forth in claim 3, wherein an ignition action of the spark plug is performed after the completion of the fuel injection.

6. An internal combustion engine as set forth in claim 1, wherein the spark plug and the fuel injector are arranged adjoining each other at a center of an inner wall of a cylinder head and wherein a discharge gap of the spark plug is arranged in a sub spray flow formed around a main spray flow of the fuel injector.

7. An internal combustion engine as set forth in claim 6, wherein fuel is injected from the fuel injector along an axis of the cylinder.

8. An internal combustion engine as set forth in claim 1, wherein the spark plug is arranged at the center of an inner wall surface of a cylinder head, a fuel injector is arranged in a peripheral portion of an inner wall surface of the cylinder head, a groove extending from below the fuel injector to below the spark plug is formed in a top surface of a piston, and the fuel injected from the fuel injector to the inside of the groove is guided by a bottom surface of the groove to be directed around the spark plug.

9. An internal combustion engine as set forth in claim 1, wherein an exhaust gas recirculation device is provided for recirculating exhaust gas exhausted from the combustion chamber into an intake passage of the engine and the inert gas comprises recirculated exhaust gas recirculated in the engine intake passage.

10. An internal combustion engine as set forth in claim 9, wherein an exhaust gas recirculation rate is more than about 55 percent.

11. An internal combustion engine as set forth in claim 9, wherein the exhaust gas recirculation device is provided with a cooler for cooling the recirculated exhaust gas.

12. An internal combustion engine as set forth in claim 1, wherein unburned hydrocarbons are exhausted from the combustion chamber in the form of a soot precursor or a state before that rather than in the form of soot and wherein an after-treatment device for oxidizing the unburned hydrocarbons exhausted from the combustion chamber is arranged in an engine exhaust passage.

13. An internal combustion engine as set forth in claim 12, wherein said after-treatment device is comprised of a catalyst having an oxidation function.

14. An internal combustion engine as set forth in claim 13, wherein said catalyst is comprised of at least one of an oxidation catalyst, a three-way catalyst, and an $NO_x$ absorbent.

15. An internal combustion engine as set forth in claim 1, wherein an air-fuel ratio in the combustion chamber is made the stoichiometric air-fuel ratio or a lean air-fuel ratio or a rich air-fuel ratio.

16. An internal combustion engine as set forth in claim 1, wherein the operating regions of the engine are divided into a low load side operating region and a high load side operating region, wherein the first combustion is performed in the low load side operating region, and the second combustion is performed in the high load side operating region.

17. An internal combustion engine as set forth in claim 16, wherein in a low load side region of the high load side operating region, fuel is injected twice in a suction stroke and an end of a compression stroke.

18. An internal combustion engine as set forth in claim 1, wherein an $NO_x$ absorbent which absorbs $NO_x$ contained in an exhaust gas when an air-fuel ratio of an inflowing exhaust gas is lean and releases the absorbed $NO_x$ when the air-fuel ratio of the inflowing exhaust gas becomes the stoichiometric air-fuel ratio or rich is arranged in the engine exhaust passage and wherein the air-fuel ratio in the combustion chamber is made the stoichiometric air-fuel ratio or rich when $NO_x$ should be released from the $NO_x$ absorbent.

19. An internal combustion engine as set forth in claim 16, wherein the high load side operating region includes a third combustion that releases $NO_x$ from an $NO_x$ absorbent when the air-fuel ratio in the combustion chamber is stoichiometric or rich.

* * * * *